US012263933B2

United States Patent
Kloetergens et al.

(10) Patent No.: US 12,263,933 B2
(45) Date of Patent: Apr. 1, 2025

(54) REMOTE CLOSING AND OPENING SYSTEM FOR A DOOR PROVIDED FOR AN ACCESS OPENING IN A FUSELAGE OF AN AIRCRAFT, AND REMOTE CLOSING METHOD

(71) Applicant: Airbus Canada Limited Partnership, Quebec (CA)

(72) Inventors: Rainer Kloetergens, Quebec (CA); Laurent Schmitt, Quebec (CA); Olivier Vidal, Quebec (CA); Sylvain Mariat, Blagnac (FR)

(73) Assignee: Airbus Canada Limited Partnership, Mirabel (CA)

( * ) Notice: Subject to any disclaimer, the term of this patent is extended or adjusted under 35 U.S.C. 154(b) by 0 days.

(21) Appl. No.: 18/519,366

(22) Filed: Nov. 27, 2023

(65) Prior Publication Data
US 2024/0174340 A1  May 30, 2024

(30) Foreign Application Priority Data

Nov. 29, 2022 (FR) ...................................... 2212467

(51) Int. Cl.
| | |
|---|---|
| *B64C 1/14* | (2006.01) |
| *E05B 81/06* | (2014.01) |
| *E05B 81/16* | (2014.01) |
| *E05B 81/56* | (2014.01) |

(Continued)

(52) U.S. Cl.
CPC ............ *B64C 1/1407* (2013.01); *E05B 81/06* (2013.01); *E05B 81/16* (2013.01); *E05B 81/56* (2013.01); *E05B 81/72* (2013.01); *E05B 83/42* (2013.01)

(58) Field of Classification Search
CPC ..... B64C 1/143; B64C 1/1407; B64C 1/1423; E05B 81/06; E05B 81/16; E05B 81/72; E05B 83/42
See application file for complete search history.

(56) References Cited

U.S. PATENT DOCUMENTS

| | | | |
|---|---|---|---|
| 4,720,065 A | 1/1988 | Hamatani | |
| 5,156,359 A * | 10/1992 | Noble | ..................... E05B 5/003 |
| | | | 292/DIG. 31 |

(Continued)

OTHER PUBLICATIONS

French Search Report for corresponding French Patent Application No. 2212467 dated May 26, 2023; priority document.

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

The system includes a closing module removably fastened to one end of the articulated arm of the door with which a door leaf is articulated, a closing module removably fastened to a structure rigidly connected to the door frame and a locking device removably fastened to the articulated arm. The closing module is able to alternately pull the closing module towards itself to move the door leaf into the closed position, and to move the closing module away from itself to move the door leaf into the open position. The locking device allows the locking lever to be moved alternately into the unlocked position to unlock the door leaf and into the locked position to lock the door leaf. The system enables the door of the aircraft to be closed remotely.

15 Claims, 12 Drawing Sheets

(51) Int. Cl.
*E05B 81/72* (2014.01)
*E05B 83/42* (2014.01)

(56) References Cited

U.S. PATENT DOCUMENTS

| | | | | |
|---|---|---|---|---|
| 5,180,121 A * | 1/1993 | Banks | ............ | E05F 15/72 |
| | | | | 49/237 |
| 5,251,851 A * | 10/1993 | Herrmann | ............ | B64C 1/143 |
| | | | | 49/141 |
| 5,289,615 A * | 3/1994 | Banks | ............ | E05D 3/122 |
| | | | | 244/905 |
| 5,305,969 A * | 4/1994 | Odell | ............ | B64C 1/1407 |
| | | | | 292/259 R |
| 5,337,977 A * | 8/1994 | Fleming | ............ | B64C 1/143 |
| | | | | D12/345 |
| 5,379,971 A * | 1/1995 | Kim | ............ | B64C 1/1407 |
| | | | | 244/129.5 |
| 5,687,452 A * | 11/1997 | Hamatani | ............ | E05D 3/127 |
| | | | | 137/493 |
| 6,116,542 A * | 9/2000 | Erben | ............ | E05C 9/08 |
| | | | | 244/129.5 |
| 6,168,114 B1 * | 1/2001 | Erben | ............ | B64C 1/143 |
| | | | | 49/153 |
| 6,341,748 B1 * | 1/2002 | Brooks | ............ | B64C 1/1407 |
| | | | | 244/129.5 |
| 6,467,729 B2 * | 10/2002 | Buchs | ............ | B64C 1/1407 |
| | | | | 244/129.5 |
| 6,834,834 B2 * | 12/2004 | Dazet | ............ | B64C 1/143 |
| | | | | 244/129.4 |
| 8,919,699 B2 * | 12/2014 | Kress | ............ | B64C 1/1407 |
| | | | | 244/129.4 |
| 9,816,307 B2 | 11/2017 | Bessettes et al. | | |
| 11,512,512 B2 * | 11/2022 | Means | ............ | E05D 7/009 |
| 11,661,167 B2 * | 5/2023 | Buchet | ............ | E05C 9/08 |
| | | | | 244/129.5 |
| 11,691,710 B2 * | 7/2023 | Beezhold | ............ | B64C 1/143 |
| | | | | 244/129.5 |
| 12,043,365 B2 * | 7/2024 | Dubosc | ............ | B64C 1/143 |
| 2002/0060270 A1 | 5/2002 | Buchs et al. | | |

\* cited by examiner

REMOTE CLOSING AND OPENING SYSTEM FOR A DOOR PROVIDED FOR AN ACCESS OPENING IN A FUSELAGE OF AN AIRCRAFT, AND REMOTE CLOSING METHOD

CROSS-REFERENCES TO RELATED APPLICATIONS

This application claims the benefit of the French patent application No. 2212467 filed on Nov. 29, 2022, the entire disclosures of which are incorporated herein by way of reference.

FIELD OF THE INVENTION

The present invention relates to a system for remotely closing and opening a door provided for an access opening in a fuselage of an aircraft, and to a method for implementing the system.

BACKGROUND OF THE INVENTION

Aircraft have at least one access opening for boarding the aircraft or disembarking the aircraft. To reach the access opening for boarding or disembarking, an airstair may be built into the aircraft. For example, after an aircraft has landed, the crew manually opens the door leaf of an access door to the access opening. The airstair is deployed or positioned in front of the access opening. Passengers and crew members can then disembark the aircraft. However, it is no longer possible to close the door leaf of the door once all of the crew members have disembarked. The closing mechanism used to manually close the door leaf is not accessible to people who are not on board the aircraft.

SUMMARY OF THE INVENTION

The present invention is intended to overcome this drawback so that a person not on board an aircraft can close the door leaf.

For this purpose, the invention relates to a system for remotely closing and opening a door provided for an access opening in a fuselage of an aircraft, the door comprising a door leaf, a frame delimiting the access opening and an articulated arm, the frame being rigidly connected to the fuselage, the door leaf being designed to be alternately in a closed position when the door leaf is closing the access opening and an open position when the door leaf leaves the access opening open, the articulated arm comprising a first end articulated with the door leaf and a second end articulated with the frame so that the door leaf remains parallel with itself when moving from the open position to the closed position and vice versa, the door further comprising a locking mechanism designed to alternately lock and unlock the door leaf when the door leaf is in the closed position, the locking mechanism comprising a locking lever having one end that is rotatably mounted on the door leaf about a rotation axis perpendicular to the door leaf, the locking lever being designed to be alternately in a locking position in which the locking mechanism locks the door leaf and an unlocked position in which the locking mechanism is not locking the door leaf. According to the invention, the system comprises:

a closing and opening device comprising a first closing and opening module intended to be removably fastened to the first end of the articulated arm and a second closing and opening module intended to be removably fastened to a structure rigidly connected to the frame, the second closing and opening module being designed to alternately pull the first closing and opening module towards itself so as to bring the door leaf towards the closed position and to move the first closing and opening module away from itself so as to bring the door leaf towards the open position, a locking and unlocking device intended to be removably fastened to the articulated arm, the locking and unlocking device being designed to move the locking lever alternately into the unlocked position to unlock the door leaf and into the locked position to lock the door leaf, a control device designed to transmit commands for closing or opening the door leaf to the closing and opening device and commands for locking or unlocking the door leaf to the locking and unlocking device, as a function of commands transmitted remotely to the control device by a user.

This enables an aircraft door to be closed or opened using the control device without having to be on board the aircraft.

Furthermore, the second closing and opening module comprises a screw-coupling system including:

a guide screw having a longitudinal rotation axis, the guide screw being designed to rotate about the longitudinal rotation axis thereof, and a lug coupling screwed to the guide screw, the lug coupling being designed to move in translation along the guide screw when the guide screw rotates, the lug coupling being removably connected to the first closing and opening module, the translational movement of the lug coupling alternately causing:

the first closing and opening module to move towards the second closing and opening module so as to bring the door leaf into the closed position, and the first closing and opening module to move away from the second closing and opening module so as to bring the door leaf into the open position.

Furthermore, the system includes a fastening device comprising:

a first fastening module designed to be rigidly connected to the first end of the articulated arm, the first closing and opening module being designed to be removably fastened to the first fastening module, a second fastening module designed to be rigidly connected to the structure rigidly connected to the frame, the second closing and opening module being designed to be removably fastened to the second fastening module, a third fastening module designed to be rigidly connected to the articulated arm, the locking and unlocking device being designed to be removably fastened to the third fastening module.

Furthermore, the first closing and opening module comprises:

a fastening support designed to be removably fastened to the first end of the articulated arm, a link coupling rotatably mounted on the fastening support about a rotation axis, the link coupling having a guide ring with a diameter coinciding with the rotation axis of the link coupling, the guide ring having an inner circular groove, the lug coupling having at least one lug designed to be at least partially removably engaged in the inner circular groove of the guide ring, the rotation axis of the link coupling being designed to be perpendicular to the longitudinal rotation axis of the guide screw when the lug coupling is engaged in the inner circular groove of the guide ring, the second closing and opening module further comprising:

a fastening support designed to be removably fastened to the structure rigidly connected to the frame, an auxiliary support rotatably mounted on the fastening support about a vertical rotation axis, the guide screw being rotatably mounted on the auxiliary support about the longitudinal rotation axis thereof, a guide tube concentrically surrounding the guide screw, the guide tube comprising at least one longitudinal slot, the lug or lugs of the lug coupling projecting from the guide tube through the longitudinal slot or slots, the guide tube being designed to engage in the guide ring of the link coupling, a first actuator designed to rotate the guide screw about the longitudinal rotation axis thereof, the control device being able to send a command to the first actuator representing an angle of rotation of the guide screw to be applied by the first actuator, the commands for closing or opening the door leaf comprising the command representing the angle of rotation of the guide screw, the rotation of the guide screw causing a translational movement of the lug coupling that is prevented from rotating by the lug or lugs projecting from the guide tube through the longitudinal slot or slots, the translational movement being parallel to the longitudinal rotation axis of the guide screw, the translational movement of the lug coupling engaged in the inner circular groove of the guide ring causing alternately:

the first closing and opening module to move away from the second closing and opening module, and the first closing and opening module to move towards the second closing and opening module.

Furthermore, the link coupling comprises at least one notch designed to allow the passage of the lug or lugs of the lug coupling when the lug or lugs moving in translation parallel to the longitudinal rotation axis of the guide screw are in front of the notch or notches, the second closing and opening module further comprising a second actuator designed to rotate an assembly comprising the guide screw as well as the first actuator and the guide tube about the longitudinal rotation axis of the guide screw, the control device being able to send a command to the second actuator representing an angle of rotation of the assembly to be applied by the second actuator, the commands for closing or opening the door leaf comprising the command representing the angle of rotation of the assembly, the rotation of the assembly alternately enabling:

the lug or lugs to be brought in front of the notch or notches to enable the lug or lugs to pass through the notch or notches to engage the lug or lugs in the inner circular groove of the guide ring or to separate the lug or lugs from the inner circular groove of the guide ring, or the lug or lugs to be moved angularly away from the notch or notches to engage the lug or lugs in the inner circular groove of the guide ring or to disengage the lug or lugs from the inner circular groove of the guide ring following separation of the lug or lugs from the inner circular groove of the guide ring.

Furthermore, the closing and opening device comprises:

a first position sensor designed to transmit an electrical signal to the control device when the lug coupling is in a closed position along the guide screw, the electrical signal transmitted by the first position sensor representing a position of the lug coupling when the lug coupling is in the closed position along the guide screw, the closed position along the guide screw being a position of the lug coupling required for the door leaf to be in the closed position, a second position sensor designed to transmit an electrical signal to the control device when the lug coupling is in an open position along the guide screw, the electrical signal transmitted by the second position sensor representing a position of the lug coupling when the lug coupling is in the open position along the guide screw, the open position along the guide screw being a position of the lug coupling required for the door leaf to be in the open position, a third position sensor designed to transmit an electrical signal to the control device when the lug coupling is in a default position along the guide screw, the electrical signal transmitted by the third position sensor representing a position of the lug coupling when the lug coupling is in the default position along the guide screw, a fourth position sensor designed to transmit an electrical signal to the control device when the lug coupling is in an engaged position, the electrical signal transmitted by the fourth position sensor representing a position of the lug coupling when the lug coupling is in the engaged position, the engaged position being a position in which the lug or lugs of the lug coupling are located in the inner circular groove of the guide ring.

Furthermore, the closing and opening device further comprises:

a fifth position sensor designed to transmit an electrical signal to the control device when the lug or lugs of the lug coupling are in front of the notch or notches, the electrical signal transmitted by the fifth position sensor representing an angular position of the second actuator when the lug or lugs of the lug coupling are in front of the notch or notches, a sixth position sensor designed to transmit an electrical signal to the control device when the lug or lugs of the lug coupling are not in front of the notch or notches, the electrical signal transmitted by the sixth position sensor representing an angular position of the second actuator when the lug or lugs of the lug coupling are not in front of the notch or notches.

Furthermore, the locking and unlocking device comprises:

a fastening support intended to be removably fastened to the articulated arm, two guide pins between which the locking lever is intended to be clamped, the two guide pins being rotatably mounted on the fastening support, a third actuator designed to rotate the two guide pins through a first angle of rotation about the rotation axis of the locking lever when the door leaf is in the closed position, the control device being able to send a command to the third actuator representing the first angle of rotation of the two guide pins to be applied by the third actuator, the commands for locking or unlocking the door leaf comprising the command representing the first angle of rotation of the two guide pins, a fourth actuator designed to rotate the two guide pins through a second angle of rotation about a rotation axis perpendicular to the rotation axis of the locking lever when the door leaf is in the closed position, the control device being able to send a command to the fourth actuator representing the second angle of rotation of the two guide pins to be applied by the fourth actuator, the commands for locking or unlocking the door leaf comprising the command representing the second angle of rotation of the two guide pins.

Furthermore, the locking and unlocking device comprises:
- a release pin designed to disengage a blocking element intended to block the door leaf in the open position once the door leaf has been opened,
- a fifth actuator designed to move the release pin in translation to disengage the blocking element by bringing the release pin into a released position, the control device being able to send a command to the fifth actuator representing a translational distance of the release pin to be applied by the fifth actuator, the commands for unlocking the door leaf comprising the command representing the translational distance of the release pin.

Furthermore, the locking and unlocking device comprises:
- a seventh position sensor designed to transmit an electrical signal to the control device when the two guide pins are clamping the locking lever, the electrical signal transmitted by the seventh position sensor representing a position of the two guide pins when the pins are clamping the locking lever,
- an eighth position sensor designed to transmit an electrical signal to the control device when the two guide pins are not clamping the locking lever, the electrical signal transmitted by the eighth position sensor representing a position of the two guide pins when the pins are not clamping the locking lever,
- a ninth position sensor designed to transmit an electrical signal to the control device when the two guide pins are in a locking position about the rotation axis of the locking lever, the electrical signal transmitted by the ninth position sensor representing a position of the two guide pins when the two guide pins are in the locking position about the rotation axis of the locking lever, the locking position being a position of the two guide pins required for the locking lever to be in the locked position,
- a tenth position sensor designed to transmit an electrical signal to the control device when the two guide pins are in an unlocked position about the rotation axis of the locking lever, the electrical signal transmitted by the tenth position sensor representing a position of the two guide pins when the two guide pins are in the unlocked position about the rotation axis of the locking lever, the unlocked position being a position of the two guide pins required for the locking lever to be in the unlocked position,
- an eleventh position sensor designed to transmit an electrical signal to the control device when the two guide pins are in a default position, the electrical signal transmitted by the eleventh position sensor representing a position of the two guide pins when the two guide pins are in the default position,
- a twelfth position sensor designed to transmit an electrical signal to the control device when an airstair at the access opening is deployed.

Furthermore, the locking and unlocking device comprises:
- a thirteenth position sensor designed to transmit an electrical signal to the control device when the release pin is not in the released position, the electrical signal transmitted by the thirteenth position sensor representing the position of the release pin,
- a fourteenth position sensor designed to transmit an electrical signal to the control device when the release pin is in the released position, the electrical signal transmitted by the fourteenth position sensor representing the released position of the release pin.

The invention also relates to a method for remotely closing the door leaf using the remote opening and closing system as specified above.

According to the invention, the closing method comprises the following steps:
- a closing step implemented by the closing and opening device that involves the second closing and opening module pulling the first closing and opening module towards itself to bring the door leaf into the closed position in response to receipt of a closing command from the control device following receipt by the control device of commands transmitted remotely by a user,
- a locking step in which the locking and unlocking device moves the locking lever into the locking position to lock the door leaf in response to receipt of a locking command from the control device.

According to one feature, the closing step comprises:
- transmission of a command from the control device to the first actuator representing an angle of rotation of the guide screw required to bring the door leaf into the closed position,
- activation of the first actuator as a function of the command representing the angle of rotation of the guide screw,
- rotation of the guide screw driven by the first actuator through the angle of rotation required to bring the door leaf into the closed position,
- translational movement of the lug coupling driven by the rotation of the guide screw,
- translational movement of the link coupling driven by the translational movement of the lug coupling,
- traction of the first end of the articulated arm driven by the translational movement of the lug coupling of the closing module until the door leaf is in the closed position.

According to another feature, the locking step comprises:
- transmission of a command from the control device to the third actuator representing an angle of rotation for positioning the two guide pins about the rotation axis of the locking lever when the door leaf is in the closed position, the positioning angle of rotation bringing the two guide pins in front of the locking lever,
- activation of the third actuator as a function of the command representing the angle of rotation for positioning the two guide pins,
- rotation of the two guide pins through the positioning angle of rotation of the two guide pins,
- transmission of a command from the control device to the fourth actuator representing an angle of rotation for clamping the two guide pins about a rotation axis perpendicular to the rotation axis of the locking lever when the door leaf is in the closed position, the clamping angle of rotation causing the two guide pins to clamp the locking lever,
- activation of the fourth actuator as a function of the command representing the angle of rotation for clamping the two guide pins,
- rotation of the two guide pins through the clamping angle of rotation of the two guide pins, transmission of a command from the control device to the third actuator representing an angle of rotation for locking the two guide pins about the rotation axis of the locking lever when the door leaf is in the closed position, the locking angle of rotation causing the two guide pins to rotate the locking lever into the locking position, activation of the third actuator as a function of the command representing the locking angle of rotation, rotation of the two guide pins through the locking angle of rotation of the two guide pins.

The invention also relates to an aircraft comprising a remote opening and closing system as specified above.

BRIEF DESCRIPTION OF THE DRAWINGS

The attached figures help to understand how the invention can be carried out. In these figures, identical reference signs refer to similar elements.

DETAILED DESCRIPTION OF THE PREFERRED EMBODIMENTS

Figure 1:
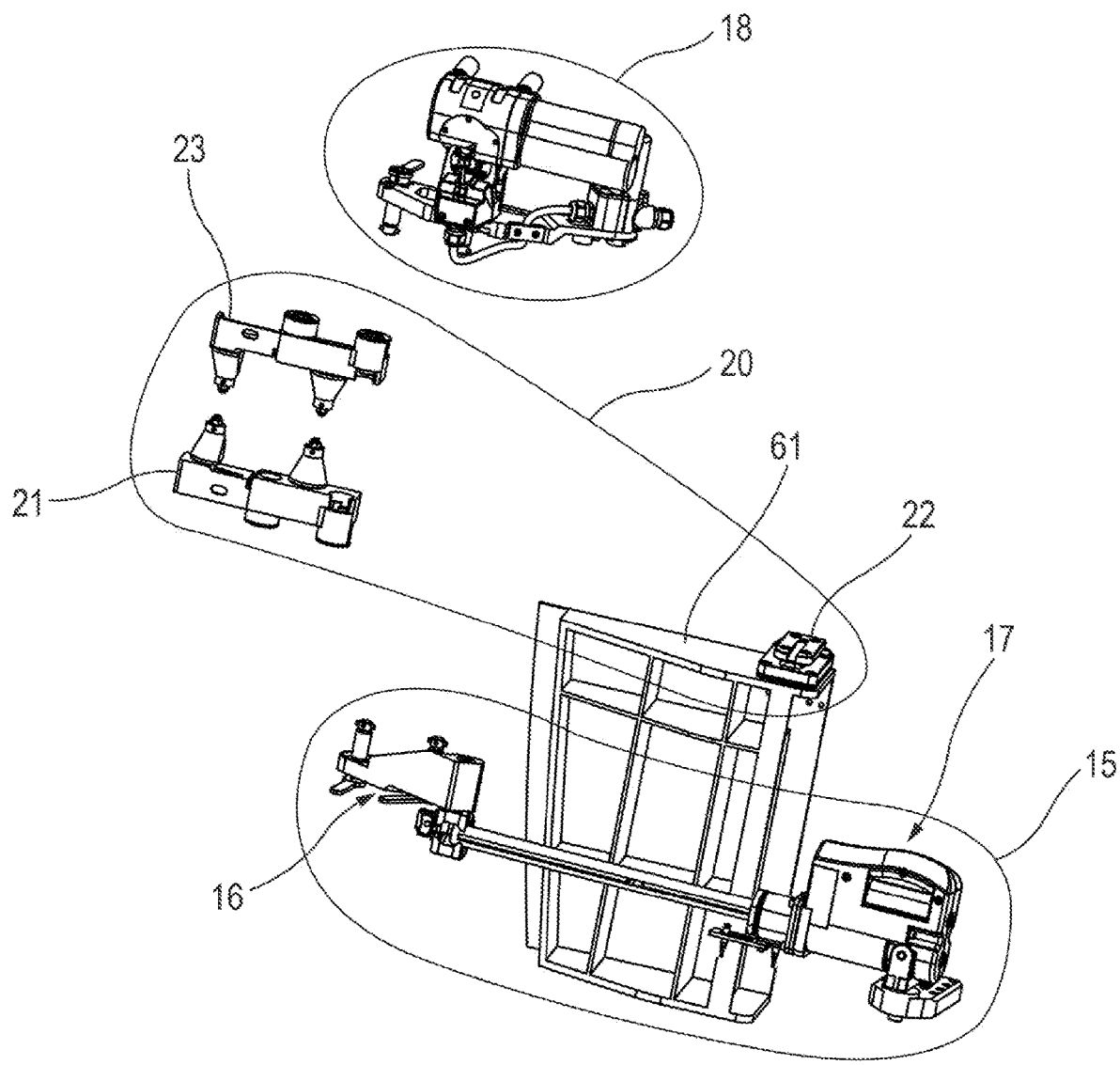
FIG. 1 is an exploded perspective view of the remote closing and opening system.

The remote closing and opening system 1 is shown in FIG. 1. In the remainder of the description, the remote closing and opening system 1 is referred to as the system 1.

Figure 3:
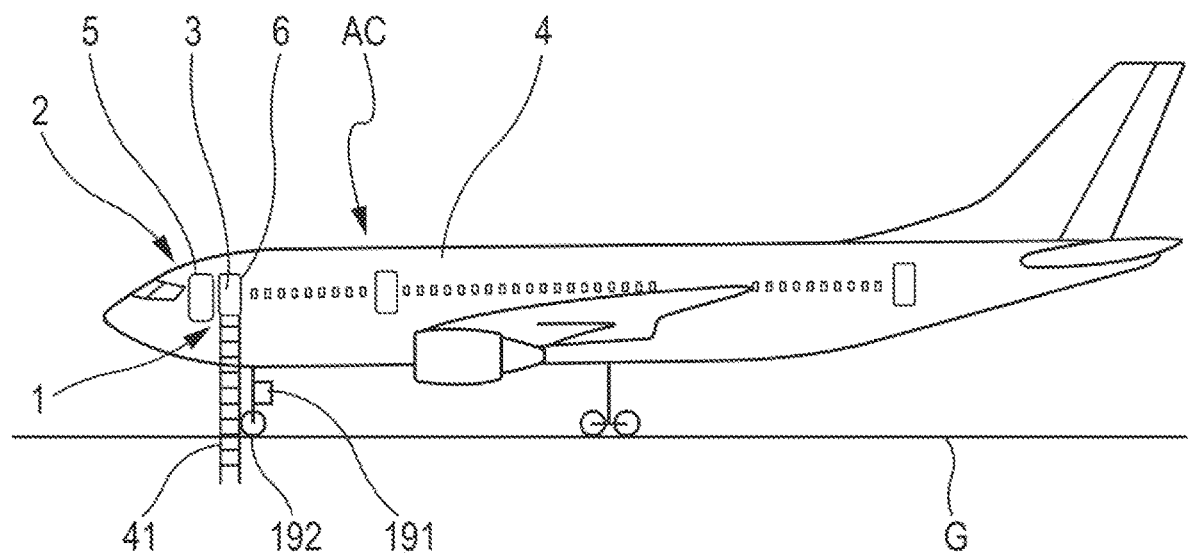
FIG. 3 is a side view of an aircraft equipped with the remote closing and opening system.
Figure 22:
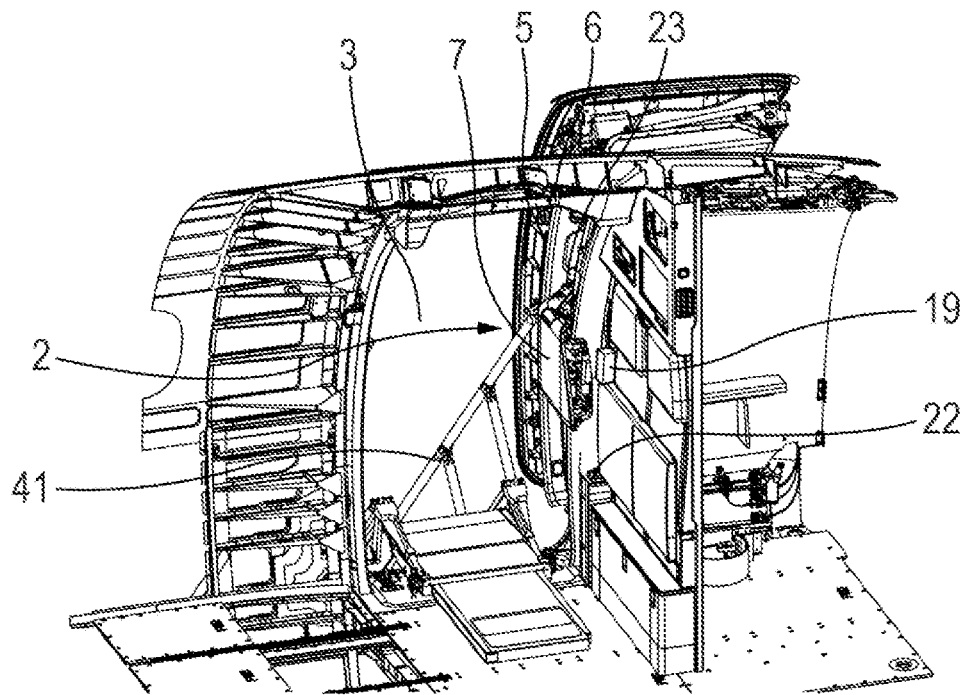
FIG. 22 is a perspective view of the interior of the fuselage of the aircraft fitted with the fastening modules and in which the airstair is deployed.

The system 1 enables the alternate and remote closing and opening of a door 2 provided for an access opening 3 in the fuselage 4 of an aircraft AC. The access opening 3 can be accessed from the ground G via an airstair 41, which may be built into the aircraft AC (FIG. 3, FIG. 22).

The door 2 comprises a door leaf 5, a frame 6 and an articulated arm 7.

The frame 6 delimits the access opening 3. The frame 6 is rigidly connected to the fuselage 4.

The door leaf 5 is designed to be alternately in a closed position when the door leaf 5 closes the access opening 3 and an open position when the door leaf 5 leaves the access opening 3 open.

The articulated arm 7 has a first end 8 articulated with the door leaf 5 and a second end 9 articulated with the frame 6 so that the door leaf 5 remains parallel with itself when moving from the open position to the closed position and vice versa (i.e., when moving from the closed position to the open position).

For example, the first end 8 is articulated with the door leaf 5 by a first vertical pivot link 10 and the second end 9 is articulated with the frame 6 by a second vertical pivot link 11. The adjective "vertical" refers to a direction perpendicular to the ground G when the aircraft AC is on the ground G.

For example (FIG. 17), the articulated arm 7 is substantially V-shaped in a cross-section perpendicular to the vertical pivot links 10 and 11. The V-shape has two legs corresponding to the first end 8 and the second end 9 respectively. The two legs of the V meet at a meeting point 101. In this example, the first vertical pivot link 10 is located at the end of the first end 8 and the second vertical pivot link 11 is located at the end of the second end 9.

Figure 2:
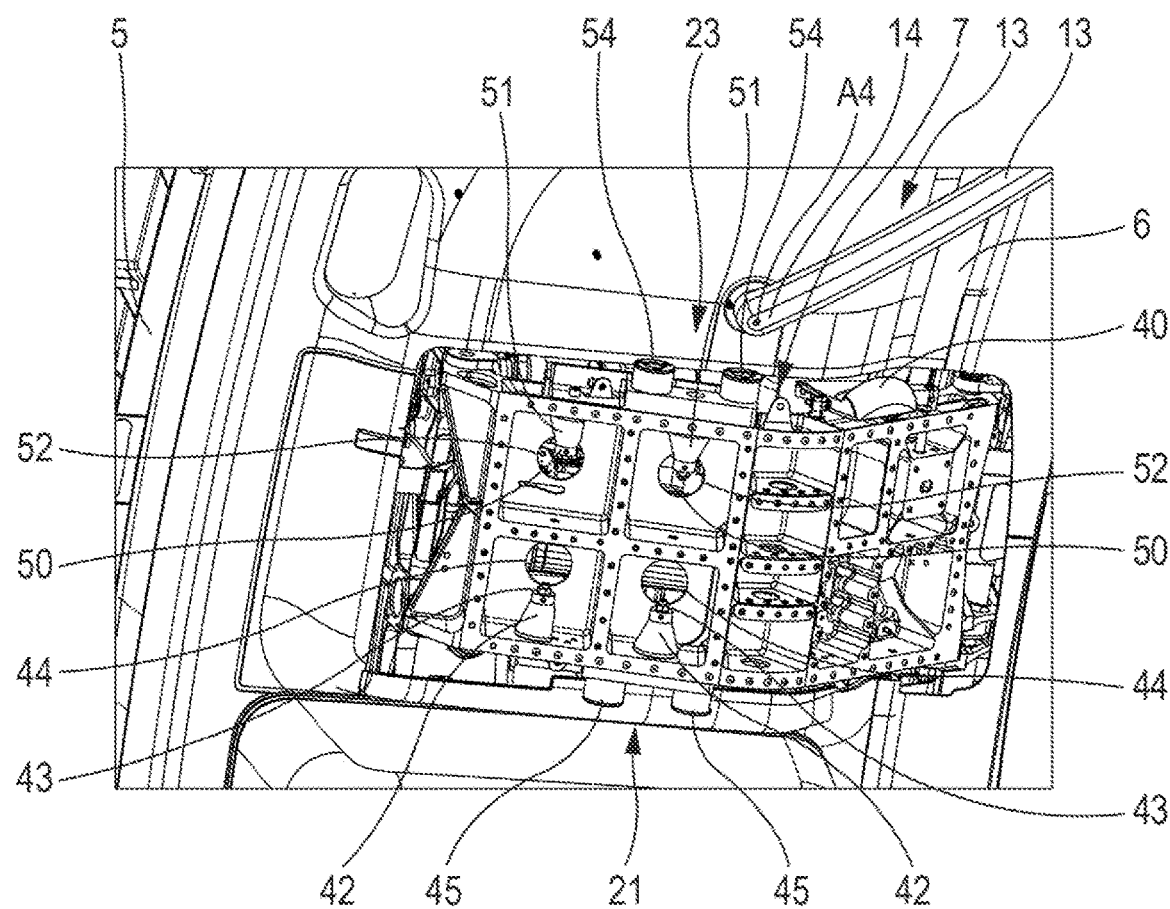
FIG. 2 shows an articulated arm of a door to which the first closing and opening module and the locking and unlocking device are fastened.
Figure 15:
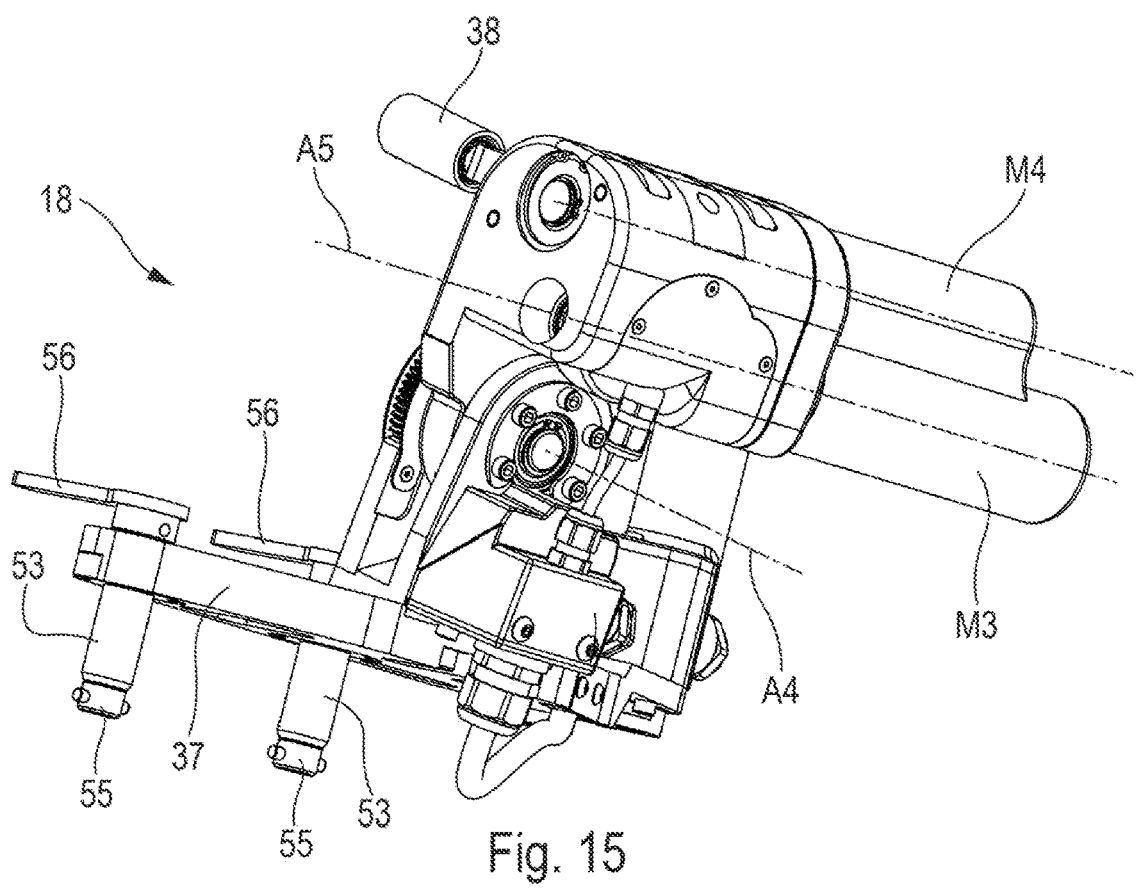
FIG. 15 is a perspective view of a third detail of the locking and unlocking device.

The door 2 also comprises a locking mechanism 12 designed to alternately lock the door leaf 5 when the door leaf 5 is in the closed position and to unlock the door leaf 5. The locking mechanism 12 comprises a locking lever 13, one end 14 of which is rotatably mounted on the door leaf 5 about a rotation axis A4 perpendicular to the door leaf 5 (FIG. 2, FIG. 15). The locking lever 13 is designed to be alternately in:

a locking position in which the locking mechanism 12 locks the door leaf 5, and an unlocked position in which the locking mechanism 12 is not locking the door leaf 5.

The system 1 comprises at least one closing and opening device 15, a locking and unlocking device 18 and a control device 19.

The closing device 15 comprises a first closing and opening module 16 and a second closing and opening module 17.

In the remainder of the description, the closing and opening device 15 is referred to as the closing device 15, to facilitate comprehension. The locking and unlocking device 18 is referred to as the locking device 18. The closing and opening module 16 is referred to as the closing module 16. The closing and opening module 17 is referred to as the closing module 17.

In the description, a first object "removably fastened" to a second object means that the first object is designed to be removable at will from the second object after having been mounted on, fastened to or assembled with the second object. Furthermore, a first object that is "rigidly connected" to a second object means that the first object is not designed to be disassembled after being mounted on or fastened to the second object (even if the object can be disassembled), and that the first object is static in relation to the second object.

The closing module 16 is intended to be removably fastened to the first end 8 of the articulated arm 7.

Figure 17:
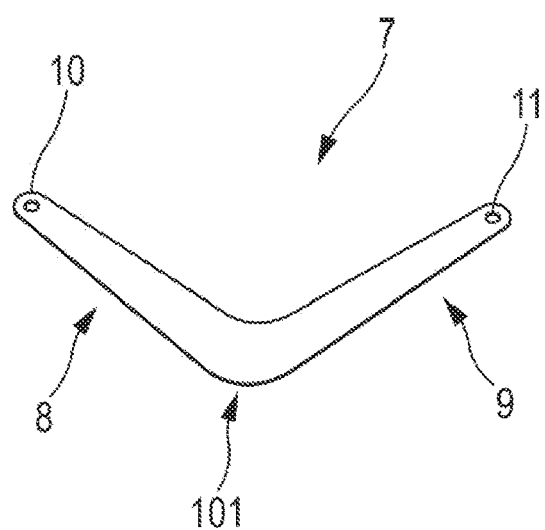
FIG. 17 is a schematic cross-section view of the articulated arm in a plane perpendicular to the vertical pivot links.

In the example shown in FIG. 17, the closing module 16 is removably fastened between the tip of the first end 8 and the meeting point 101 of the two legs of the V.

The closing module 17 is intended to be removably fastened to a structure 61 rigidly connected to the frame 6.

The closing module 17 is able to alternatively:
pull the closing module 16 towards itself so as to bring the door leaf 5 into the closed position, and
move the closing module 16 away from itself so as to bring the door leaf 5 into the open position.

The locking device 18 is intended to be removably fastened to the articulated arm 7.

For example, the locking device 18 is intended to be removably fastened to the articulated arm 7 in line with the closing module 16. In the example shown in FIG. 17, the locking device 18 is removably fastened between the tip of the first end 8 and the meeting point 101 of the two legs of the V.

The locking device 18 is designed to move the locking lever 13 alternately:
into the unlocked position to unlock the door leaf 5, and
into the locked position to lock the door leaf 5.

The control device 19 is designed to transmit:
close commands or open commands for the door leaf 5 to the closing device 15, and
lock commands or unlock commands for the door leaf 5 to the locking device 18.

For example, the control device 19 can be fastened inside the aircraft AC (FIG. 22).

The close and open commands for the door leaf 5, and the lock and unlock commands are transmitted by the control device 19 as a function of commands remotely transmitted by a user to the control device 19.

The control device 19 can receive commands from the user of a human-machine interface 191. A user can command the closing and locking of the door leaf 5, or the unlocking and opening of the door leaf 5 via the human-machine interface 191. The human-machine interface 191 may be a physical or virtual keyboard. For example, the keypad may include a physical or virtual button to send a command to the control device 19 to close and lock the door leaf 5 when the user presses this button. The keypad can also have a physical or virtual button to send a command to the control device 19 to unlock and open the door leaf 5 when the user presses this button. Depending on the command received by the control device 19 from the human-machine interface 191, the control device transmits close commands or open commands for the door leaf 5 to the closing device 15 and lock commands or unlock commands for the door leaf 5 to the locking device 18. Advantageously, the human-machine interface 191 is mounted on a part of the aircraft AC that is easily accessible to a user on the ground G, for example on the nose landing gear 192. The human-machine interface can also be detachable from the aircraft AC. The human-machine interface 191 may also include physical or virtual buttons for deploying or retracting the airstair 41. Furthermore, the human-machine interface 191 can include a display device, such as a screen or light signals. The display device can provide the user with confirmation of the closing and locking of the door leaf 5, or the opening of the door leaf 5. For example, if the control device 19 transmits a signal to the human-machine interface 191 confirming the closing (and locking) of the door leaf 5, a light signal is activated (lights up). If the control device 19 transmits a signal to the human-machine interface 191 confirming that the door leaf 5 has been opened, another light signal is activated. The signals exchanged between the human-machine interface 191 and the control device 19, such as commands, can be transmitted over a wired or wireless link.

Figure 4:
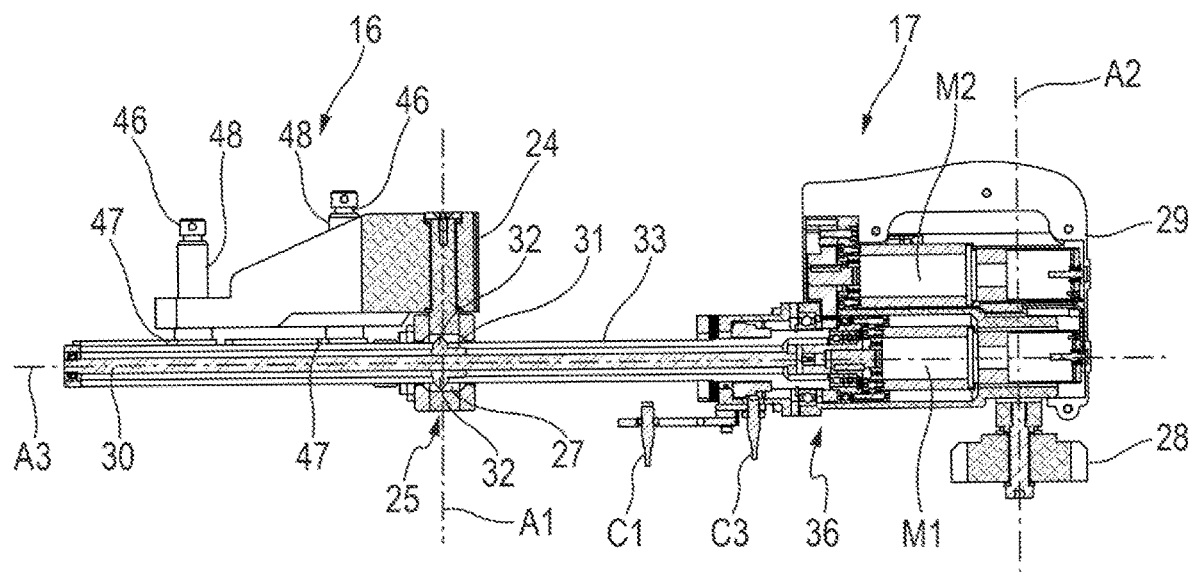
FIG. 4 is a perspective view of the remote closing and opening system.

The closing module 17 can comprise a screw-coupling system comprising a guide screw 30 and a lug coupling 31, as shown in FIG. 4.

Figure 5:
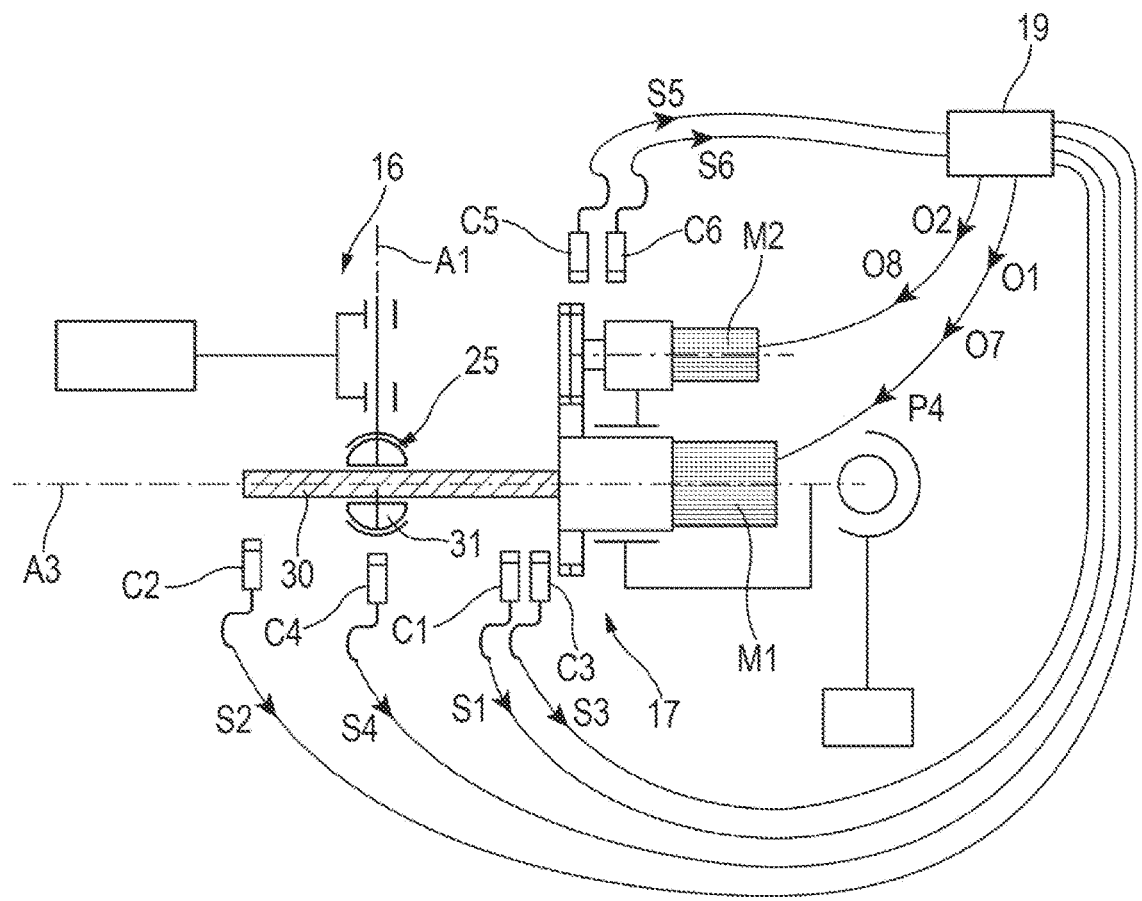
FIG. 5 is a schematic view of the closing and opening device.

The guide screw 30 has a longitudinal rotation axis A3 (FIG. 4 and FIG. 5). The guide screw 30 is designed to rotate about the longitudinal rotation axis A3 thereof.

The lug coupling 31 is screwed to the guide screw 30. The lug coupling 31 is removably connected to the closing module 16. The lug coupling 31 is designed to move in translation along the guide screw 30 when the guide screw 30 rotates about the longitudinal rotation axis A3. The direction of translational movement of the lug coupling 31 depends on the direction of rotation of the guide screw 30.

The translational movement of the lug coupling 31 alternately causes:
the closing module 16 to move towards the closing module 17 to bring the door leaf 5 into the closed position, and
the closing module 16 to move away from the closing module 17 to bring the door leaf 5 into the open position.

As shown in FIG. 4, the closing module 16 may comprise a fastening support 24 and a link coupling 25.

The fastening support 24 is designed to be removably fastened to the first end 8 of the articulated arm 7.

Figure 6:
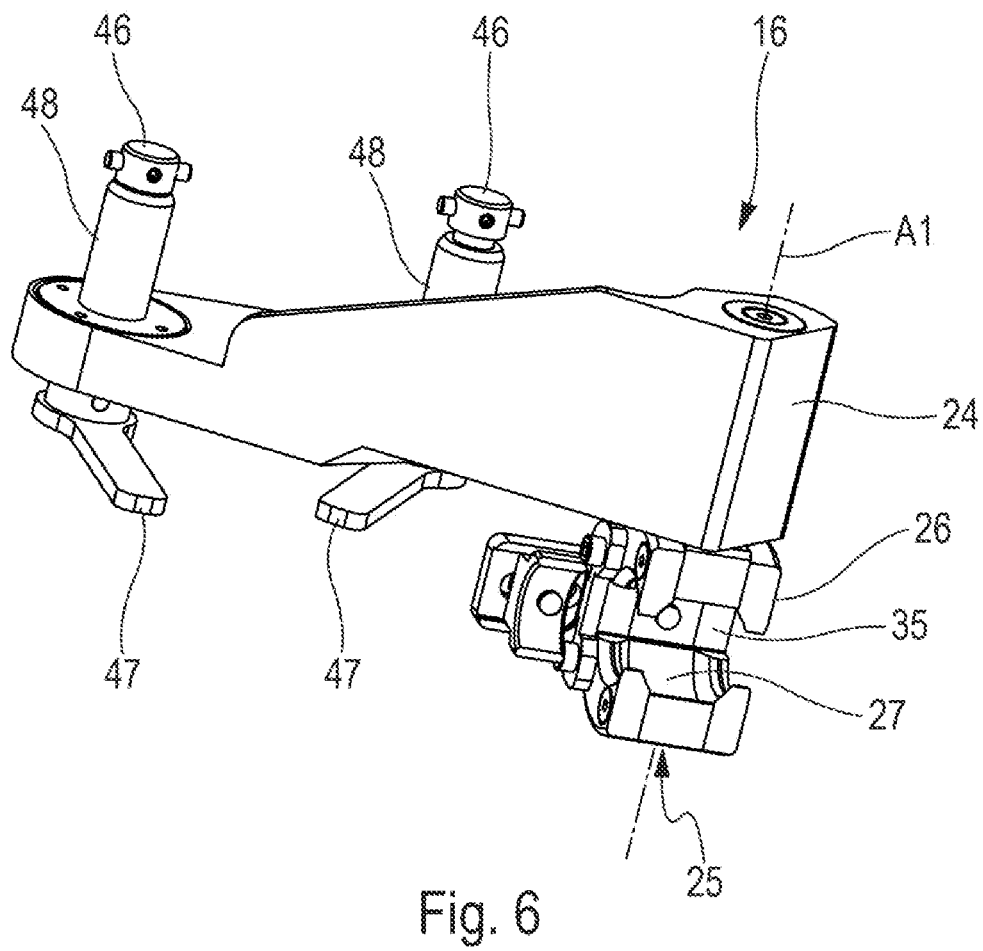
FIG. 6 is a perspective view of the first closing and opening module.
Figure 7:
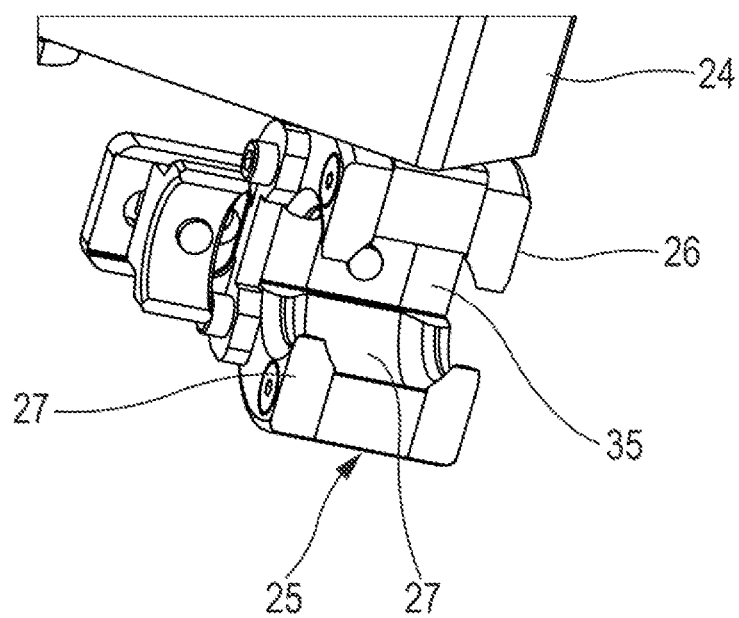
FIG. 7 is a perspective view of the link coupling of the first closing and opening module.
Figure 8:
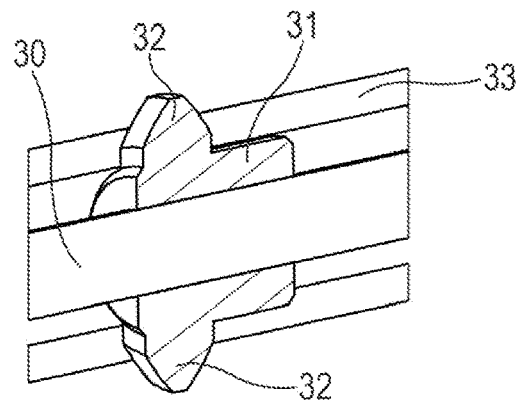
FIG. 8 is a cross-section view of the lug coupling along the longitudinal axis of the guide screw.
Figure 9:
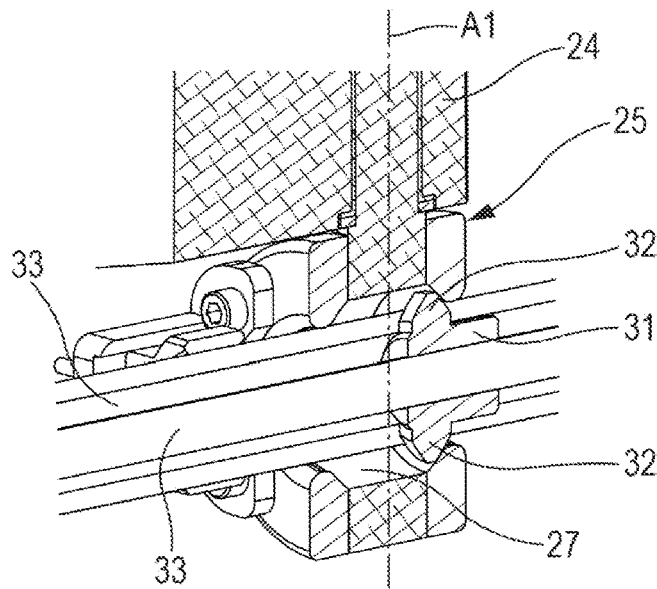
FIG. 9 is a cross-section view of the lug coupling engaged in the link coupling along the longitudinal axis of the guide screw.

The link coupling 25 is rotatably mounted on the fastening support 24 about a rotation axis A1 (FIG. 4, FIG. 9). The link coupling 25 has a guide ring 26, the diameter of which coincides with the rotation axis A1 of the link coupling 25. The guide ring 26 has an inner circular groove 27 (FIG. 4, FIG. 6, FIG. 7, FIG. 9 and FIG. 10). The guide ring 26 can be partially open, as shown in FIG. 5 and FIG. 6. The lug coupling 31 has at least one lug 32 intended to be at least partially removably engaged in the inner circular groove 27 of the guide ring 26 (FIG. 8 and FIG. 9). The rotation axis A1 of the link coupling 25 is intended to be perpendicular to the longitudinal rotation axis A3 of the guide screw 30 when the lug coupling 31 is engaged in the inner circular groove 27 of the guide ring 26.

As shown in FIG. 8 and FIG. 9, the lug coupling 31 may comprise two lugs 32 extending in diametrically opposed directions.

As shown in FIG. 4, the closing module 17 may comprise a fastening support 28, an auxiliary support 29, a guide tube 33, and an actuator M1.

The fastening support 28 is designed to be removably fastened to the structure 61 rigidly connected to the frame 6.

The auxiliary support 29 is rotatably mounted on the fastening support 28 about a vertical rotation axis A2. The guide screw 30 is rotatably mounted on the auxiliary support 29 about the longitudinal rotation axis A3 thereof. The vertical rotation axis A2 can be substantially perpendicular to the longitudinal rotation axis A3.

Figure 10:
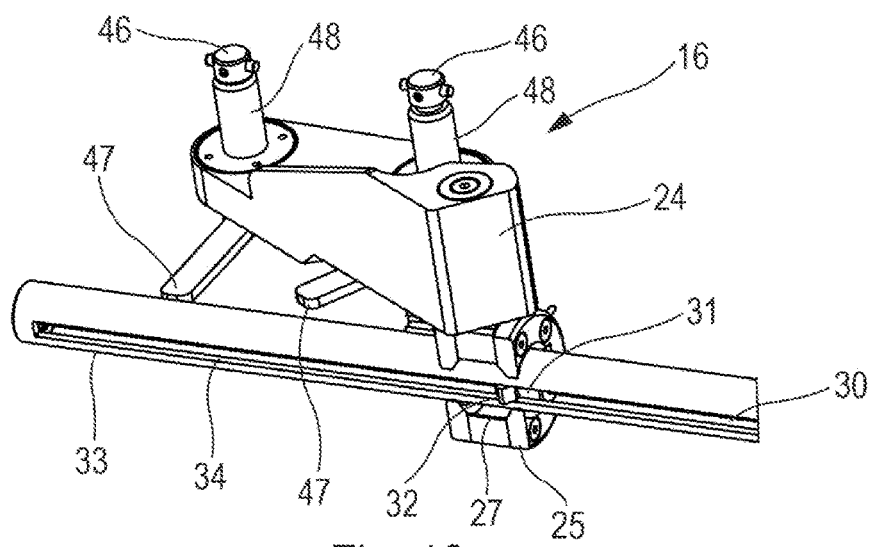
FIG. 10 is a perspective view of the first closing and opening module and the guide tube of the second closing and opening module.

The guide tube 33 concentrically surrounds the guide screw 30, i.e., the longitudinal axis of the guide tube 33 coincides with the longitudinal rotation axis A3 of the guide screw 30. The guide tube 33 is rigidly connected to the auxiliary support 29. The guide tube 33 comprises at least one longitudinal slot 34. The longitudinal slot or slots run parallel to the longitudinal rotation axis A3. The lug or lugs 32 of the lug coupling 31 project from the guide tube 33 through the longitudinal slot or slots 34. As shown in FIG. 10, the guide tube 33 may comprise two longitudinal slots 34 designed to allow the lugs 32 of a lug coupling 31 to project from the guide tube 33 (FIG. 8 and FIG. 9). Furthermore, the guide tube 33 is designed to engage in the guide ring 26 of the link coupling 25.

The actuator M1 is designed to rotate the guide screw 30 about the longitudinal rotation axis A3 thereof. The control device 19 can send the actuator M1 a command O1 representing an angle of rotation of the guide screw 30 to be applied by the first actuator M1. The commands to close or open the door leaf 5 include the command O1 representing the angle of rotation of the guide screw 30 (FIG. 5).

Thus, the rotation of the guide screw 30 causes the translational movement of the lug coupling 31, which is prevented from rotating by the lug or lugs 32 projecting from the guide tube 33 through the longitudinal slot or slots 34. The translational movement of the lug coupling 31 is parallel to the longitudinal rotation axis A3 of the guide screw 30. The translational movement of the lug coupling 31 engaged in the inner circular groove 27 of the guide ring 26 alternately causes:

the closing module 16 to move away from the closing module 17 in response to an open command from the control device 19, and the closing module 16 to move towards the closing module 17 in response to a close command from the control device 19.

The link coupling 25 can comprise at least one notch 35 designed to allow the passage of the lug or lugs 32 of the lug coupling 31 when the lug or lugs 32 moving in translation parallel to the longitudinal rotation axis A3 of the guide screw 30 are in front of the notch or notches 35. As shown in FIG. 6 and FIG. 7, the link coupling may comprise two notches 35 designed to allow the passage of the two lugs 32 (FIG. 8, FIG. 10). As shown in FIG. 10, one of the two notches 35 may be the open portion of the guide ring 26.

The closing module 17 can also comprise an actuator M2 designed to rotate an assembly 36 comprising the guide screw 30, the actuator M1 and the guide tube 33 about the longitudinal rotation axis A3 of the guide screw 30. The control device 19 can send the actuator M2 a command O2 representing an angle of rotation of the assembly 36 to be applied by the actuator M2. The commands to close or open the door leaf 5 can include the command representing the angle of rotation of the assembly 36.

The rotation of the assembly 36 alternately:

brings the lug or lugs 32 in front of the notch or notches 35 to allow the lug or lugs 32 to pass through the notch or notches 35 (FIG. 10):

to engage the lug or lugs 32 in the inner circular groove 27 of the guide ring 26, or to separate the lug or lugs 32 from the inner circular groove 27 of the guide ring 26, or moves the lug or lugs 32 angularly away from the notch or notches 35 (FIG. 9):

to engage the lug or lugs 32 in the inner circular groove 27 of the guide ring 26, or to disengage the lug or lugs 32 from the inner circular groove 27 of the guide ring 26 following separation of the lug or lugs 32 from the inner circular groove 27 of the guide ring 26.

The closing device 15 can also comprise a position sensor C1, a position sensor C2, a position sensor C3 and a position sensor C4 (FIG. 4, FIG. 5).

The position sensor C1 is designed to transmit an electrical signal S1 to the control device 19 when the lug coupling 31 is in a closed position along the guide screw 30. The electrical signal S1 transmitted by the position sensor C1 represents a position of the lug coupling 31 when the lug coupling 31 is in the closed position along the guide screw 30. The closed position along the guide screw 30 is a position of the lug coupling 31 required for the door leaf 5 to be in the closed position.

The position sensor C2 is designed to transmit an electrical signal S2 to the control device 19 when the lug coupling 31 is in an open position along the guide screw 30. The electrical signal S2 transmitted by the position sensor C2 represents a position of the lug coupling 31 when the lug coupling 31 is in the open position along the guide screw 30. The open position along the guide screw 30 is a position of the lug coupling 31 required for the door leaf 5 to be in the open position.

The position sensor C3 is designed to transmit an electrical signal S3 to the control device 19 when the lug coupling 31 is in a default position along the guide screw 30. The electrical signal S3 transmitted by the position sensor C3 represents a position of the lug coupling 31 when the lug coupling 31 is in the default position along the guide screw 30. The lug coupling 31 may be in the default position when the closing module 17 is not fastened to the structure 61 rigidly connected to the frame 6, or when no command is transmitted to the closing module 17 to open or close the door leaf 5, or before the closing module 17 is disassembled. The default position may be a position of the lug coupling 31 closest to the fastening support 28 along the guide screw 30.

The position sensor C4 is designed to transmit an electrical signal S4 to the control device 19 when the lug coupling 31 is in an engaged position. The electrical signal S4 transmitted by the position sensor C4 represents a position of the lug coupling 31 when the lug coupling 31 is in the engaged position. The engaged position is a position in which the lug or lugs 32 of the lug coupling 31 are located in the inner circular groove 27 of the guide ring 26.

The closing device 15 may also include a position sensor C5 and a position sensor C6 (FIG. 5).

The position sensor C5 is designed to transmit an electrical signal S5 to the control device 19 when the lug or lugs 32 of the lug coupling 31 are in front of the notch or notches 35. The electrical signal S5 transmitted by the position sensor C5 represents an angular position of the actuator M2 when the lug or lugs 32 of the lug coupling 31 are in front of the notch or notches 35.

The position sensor C6 is designed to transmit an electrical signal S6 to the control device 19 when the lug or lugs 32 of the lug coupling 31 are not in front of the notch or notches 35. The electrical signal S6 transmitted by the position sensor C6 represents an angular position of the actuator M2 when the lug or lugs 32 of the lug coupling 31 are not in front of the notch or notches 35 (FIG. 9).

Figure 11:
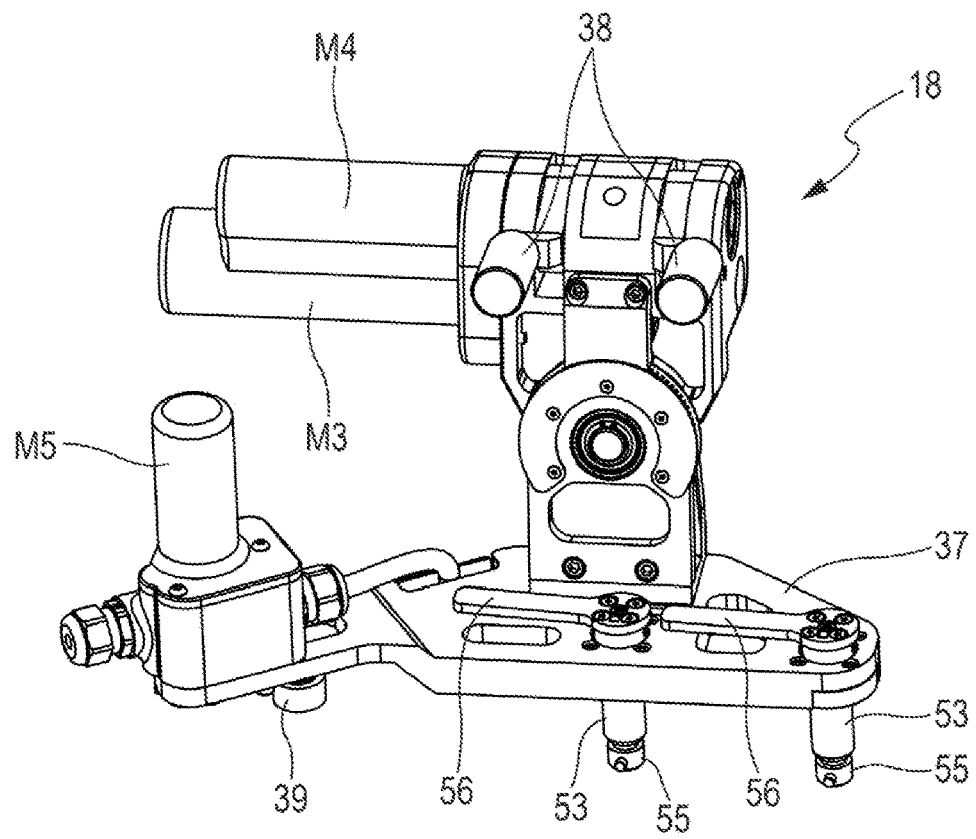
FIG. 11 is a perspective view of the locking and unlocking device.

As shown in FIG. 11, the locking device 18 that cooperates with the closing device 15 comprises a fastening support 37, two guide pins 38, an actuator M3 and an actuator M4.

The fastening support 37 is intended to be removably fastened to the articulated arm 7.

Figure 14:
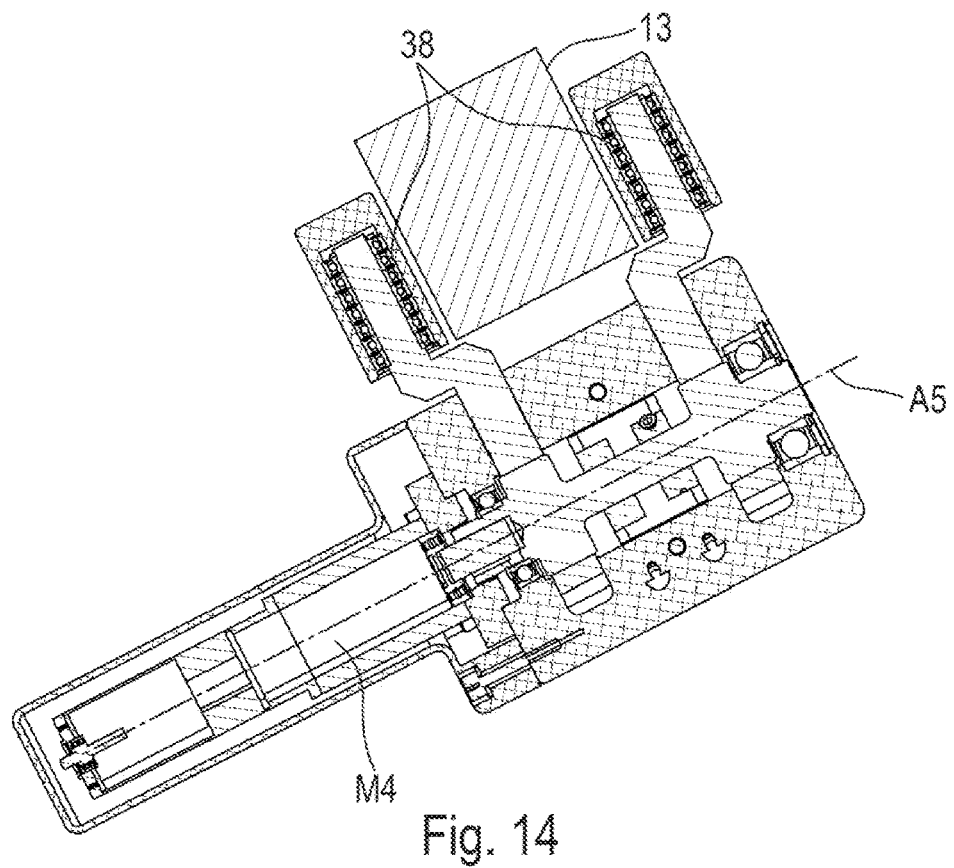
FIG. 14 is a cross-section view of a second detail of the locking and unlocking device.

The two guide pins 38 are designed to clamp the locking lever 13 therebetween (FIG. 2, FIG. 14). The two guide pins 38 are rotatably mounted on the fastening support 37 about two rotation axes A4 and A5 (FIG. 14, FIG. 15).

The actuator M3 is designed to rotate the two guide pins 38 through a first angle of rotation about the rotation axis A4 of the locking lever 13 when the door leaf 5 is in the closed position. The control device 19 can send the actuator M3 a command O3 representing the first angle of rotation of the two guide pins 38. The command O3 is intended to be implemented by the actuator M3. The commands for locking or unlocking the door leaf 5 include the command O3 representing the first angle of rotation of the two guide pins 38.

Figure 12:
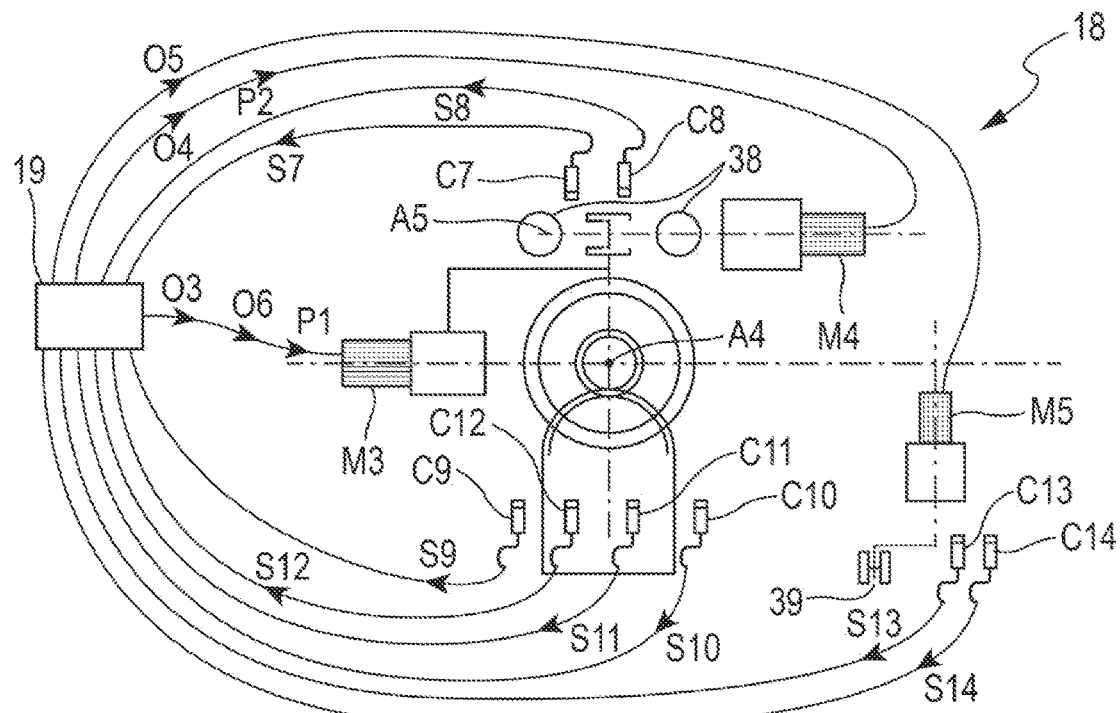
FIG. 12 is a schematic view of the locking and unlocking device.

The actuator M4 is designed to rotate the two guide pins 38 through a second angle of rotation about a rotation axis A5 perpendicular to the rotation axis A4 of the locking lever 13 when the door leaf 5 is in the closed position. The control device 19 can send the actuator M4 a command O4 representing the second angle of rotation of the two guide pins 38. The command O4 is intended to be implemented by the actuator M4. The commands for locking or unlocking the door leaf 5 include the command O4 representing the second angle of rotation of the two guide pins 38 (FIG. 12).

Figure 13:
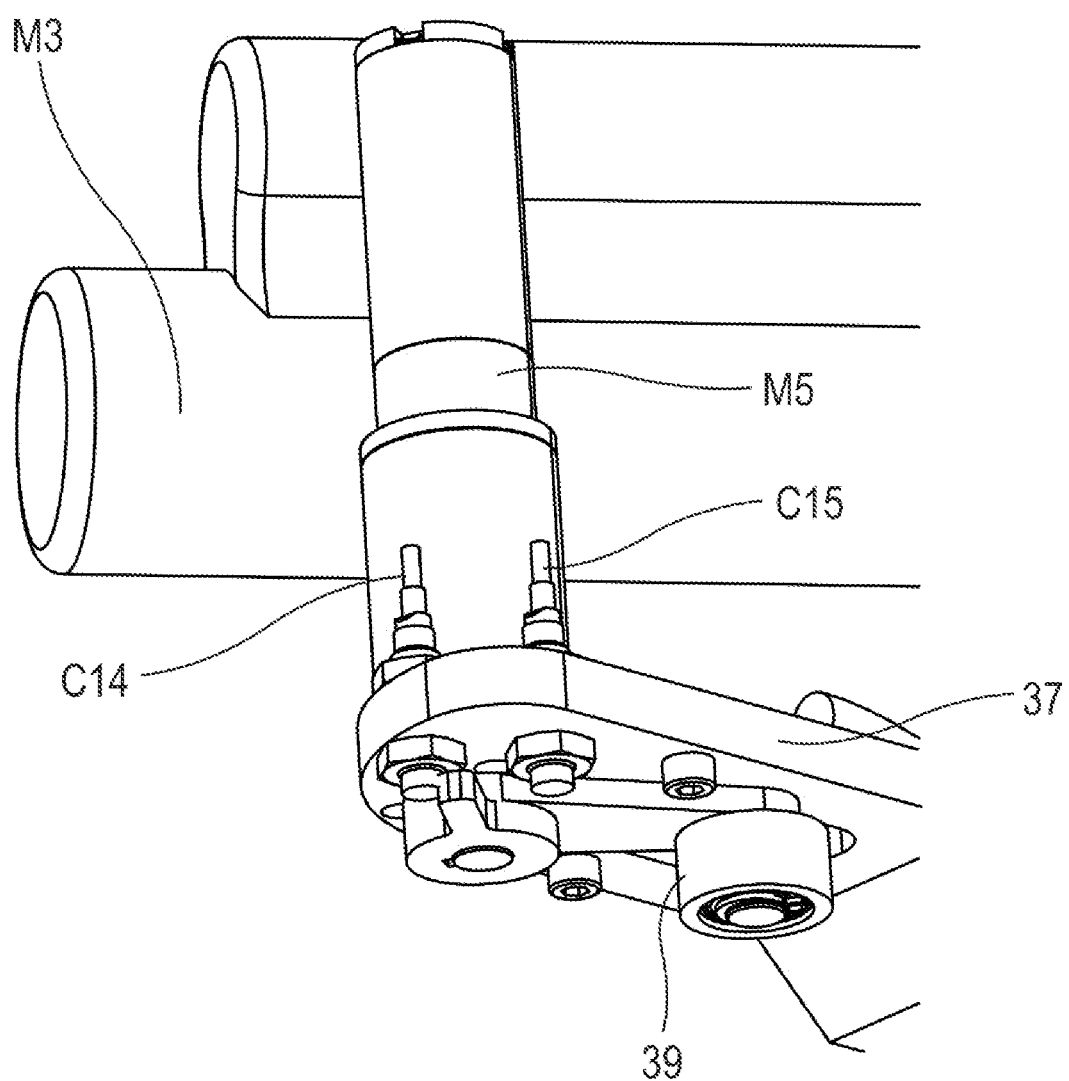
FIG. 13 is a perspective view of a first detail of the locking and unlocking device.

The locking device 18 may further comprise a release pin 39 and an actuator M5 (FIG. 13).

The release pin 39 is designed to disengage a blocking element 40 intended to block the door leaf 5 in the open position once the door leaf 5 has been opened. The blocking element 40 may be a locking pin that automatically engages, blocking the door leaf 5 in the open position thereof when the door leaf 5 is moved into the open position. Typically, to disengage the locking pin (thereby releasing the door leaf 5), a user manually acts on the blocking element 40 to disengage the locking pin. The release pin 39 of the locking device 18 of the system 1 acts on the blocking element 40 to disengage the locking pin of the blocking element 40 remotely.

The actuator M5 is designed to move the release pin 39 in translation to disengage the blocking element 40 by bringing the release pin 39 into a released position. The control device 19 is able to send the actuator M5 a command O5 S14. The command O5 is intended to be implemented by the actuator M5. The commands for unlocking the door leaf 5 include the command O5 representing the translational distance of the release pin 39 (FIG. 12).

The locking device 18 can also comprise a position sensor C7, a position sensor C8, a position sensor C9, a position sensor C10, a position sensor C11, and a position sensor C12 (FIG. 12).

The position sensor C7 is designed to transmit an electrical signal S7 to the control device 19 when the two guide pins 38 are clamping the locking lever 13. The electrical signal S7 transmitted by the position sensor C7 represents a position of the two guide pins 38 when clamping the locking lever 13.

The position sensor C8 is designed to transmit an electrical signal S8 to the control device 19 when the two guide pins 38 are not clamping the locking lever 13. The electrical signal S8 transmitted by the position sensor C8 represents a position of the two guide pins 38 when not clamping the locking lever 13.

The position sensor C9 is designed to transmit an electrical signal S9 to the control device 19 when the two guide pins 38 are in a locking position about the rotation axis A4 of the locking lever 13. The electrical signal S9 transmitted by the position sensor C9 represents a position of the two guide pins 38 when the two guide pins 38 are in the locking position about the rotation axis A4 of the locking lever 13. The locking position is a position of the two guide pins 38 required for the locking lever 13 to be in the locked position.

The position sensor C10 is designed to transmit an electrical signal S10 to the control device 19 when the two guide pins 38 are in an unlocked position about the rotation axis A4 of the locking lever 13. The electrical signal S10 transmitted by the position sensor C10 represents a position of the two guide pins 38 when the two guide pins 38 are in the unlocked position about the rotation axis A4 of the locking lever 13. The unlocked position is a position of the two guide pins 38 required for the locking lever 13 to be in the unlocked position.

The position sensor C11 is designed to transmit an electrical signal S11 to the control device 19 when the two guide pins 38 are in a default position. The electrical signal S11 transmitted by the position sensor C11 represents a position of the two guide pins 38 when the two guide pins 38 are in the default position. The two guide pins may be in the default position when the locking device 18 is not fastened to the articulated arm 7, or when no command is transmitted to the locking device 18 to lock or unlock the door leaf 5, or before the locking device 18 is disassembled. The default position may be a position in which the two guide pins 38 are not clamping the locking lever 13.

The position sensor C12 is designed to transmit an electrical signal S12 to the control device 19 when the airstair 41 at the access opening 3 is deployed.

The locking device 18 may also include a position sensor C13 and a position sensor C14 (FIG. 12, FIG. 13).

The position sensor C13 is designed to transmit an electrical signal S13 to the control device 19 when the release pin 38 is not in the released position. The electrical signal S13 transmitted by the position sensor C13 represents the position of the release pin 38 when not releasing the blocking element 40.

The position sensor C14 is designed to transmit an electrical signal S14 to the control device 19 when the release pin 39 is in the released position. The electrical signal S14 transmitted by the position sensor C14 represents the released position of the release pin 39.

Preferably, in order to removably fasten the closing module 16 to the first end 8 of the articulated arm 7, the closing module 17 to the structure 61 rigidly connected to the frame 6, and the locking device 18 to the articulated arm 7, the system comprises a fastening device 20 (FIG. 1, FIG. 16a, FIG. 16b, FIG. 20, FIG. 21).

By way of example, the closing modules 16, 17 are made of aluminum.

The fastening device 20 comprises a fastening module 21, a fastening module 22, and a fastening module 23.

The fastening module 21 is designed to be rigidly connected to the first end 8 of the articulated arm 7.

In the example shown in FIG. 17, the fastening module 21 is rigidly connected between the tip of the first end 8 and the meeting point 101 of the two legs of the V.

The closing module 16 is intended to be removably fastened to the fastening module 21.

Figure 16A:
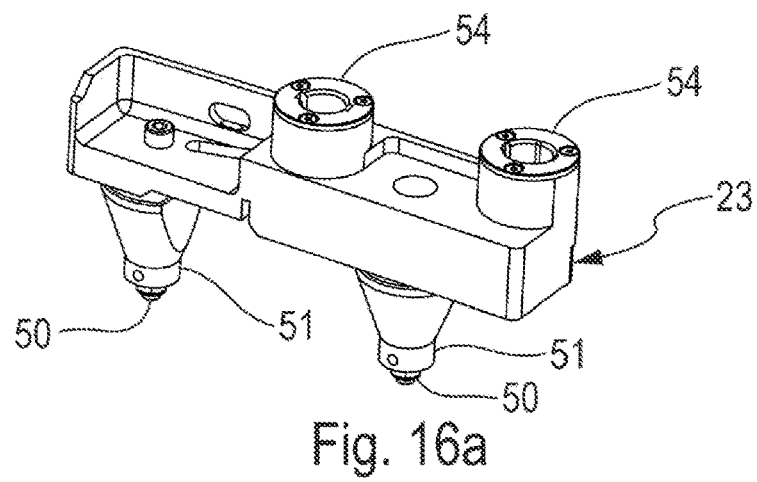
FIG. 16a is a perspective view of the third fastening module.
Figure 16B:
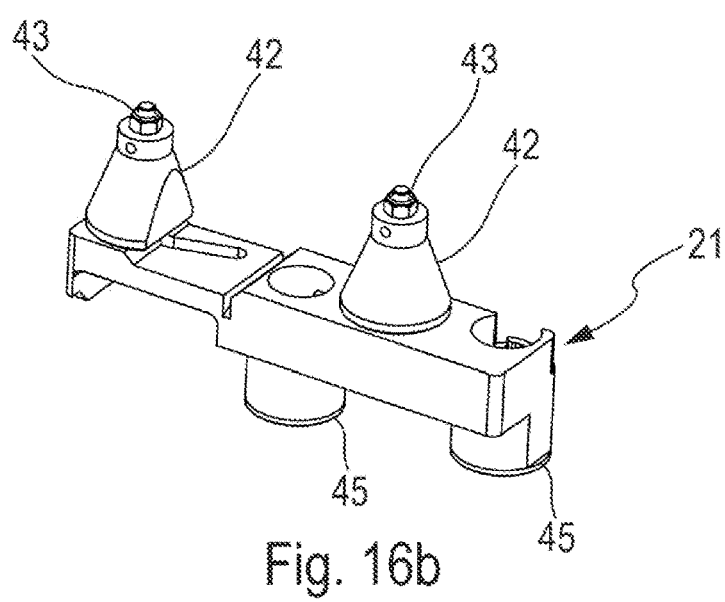
FIG. 16b is a perspective view of the first fastening module.
Figure 18:
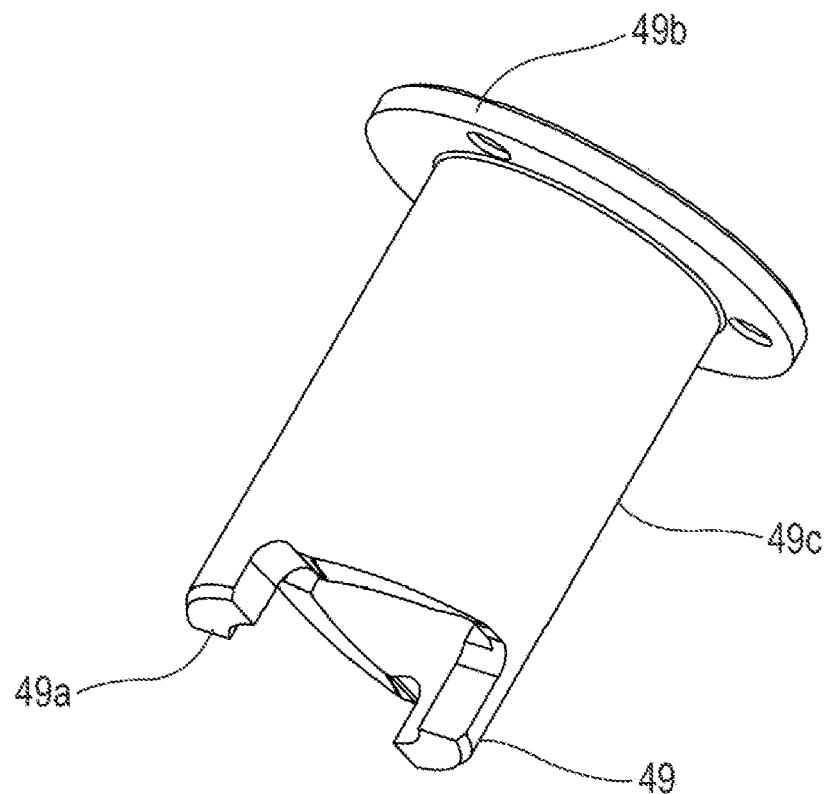
FIG. 18 is a perspective view of a ramp for a locking sleeve of the first or third fastening module.

In one embodiment, as shown in FIG. 1 and FIG. 16b, the fastening module 21 is intended to be bolted to the first end of the articulated arm 7 so as to be rigidly connected to the first end 8 of the articulated arm 7. The fastening module 21 is bolted using bolts 43 passing through existing openings in the articulated arm 7 (FIG. 2). This obviates the need to modify the structure of the articulated arm 7 by creating new openings to insert the bolts 43. Furthermore, the fastening module 21 includes two clamping cones 42. These clamping cones 42 provide access to the nut of the bolts 43 by positioning the bolting point in front of the existing openings 44 in the articulated arm 7. This obviates the need to modify the structure of the articulated arm 7. Advantageously, the fastening support 24 of the closing module 16 comprises two locking pins 48 and the fastening module 21 comprises two locking sleeves 45. Each of the two locking pins 48 is intended to be inserted into a locking sleeve 45. Each of the two locking pins 48 has a quarter-turn fastening stud 46, enabling quarter-turn fastening in cooperation with a locking ramp 49 included in each of the two locking sleeves 45 (FIG. 18). For example, the locking ramp 49 is a first end 49a of a cylinder 49c coaxial with the locking sleeves 45. The second end 49b of the cylinder 49c is fastened to the mouth of the locking sleeves 45. Each of the two locking pins 48 also includes a handle 47 enabling a user to rotate the quarter-turn fastening stud 46 of each of the two locking pins 48 to removably fasten the closing module 16 to the fastening module 21 or detach the closing module 16 from the fastening module 21. Preferably, one of the two locking sleeves 45 has a different shape to the other sleeve. For example, one locking sleeve 45 is a cylinder with a circular section and the other locking sleeve 45 is a cylinder with an oblong section. Each of the two locking pins 48 is shaped to fit the locking sleeve 45 in which the locking pin is intended to be inserted. This ensures that a user cannot incorrectly position the closing module 16 relative to the fastening module 21 when fastening the closing module in the fastening module 21. The locking sleeves 45 are, for example, made of stainless steel to prevent corrosion.

Furthermore, the fastening device 20 comprises a fastening module 23 designed to be rigidly connected to the articulated arm 7. For example, the fastening module 23 is designed to be rigidly connected to the articulated arm 7 in line with the fastening module 21. In the example shown in FIG. 17, the fastening module 23 is rigidly connected between the tip of the first end 8 and the meeting point 101 of the two legs of the V.

The locking module 18 is intended to be removably fastened to the fastening module 23.

In one embodiment, as shown in FIG. 1 and FIG. 16a, the fastening module 23 is intended to be bolted to the articulated arm 7 so as to be rigidly connected to the articulated arm 7. As with the fastening module 21, the fastening module 23 is bolted using bolts 50 passing through existing openings in the articulated arm 7. This obviates the need to modify the structure of the articulated arm 7 by creating new openings to insert the bolts 50. Similarly, the fastening module 23 includes two clamping cones 51. These clamping cones 51 provide access to the nut of the bolts 50 by positioning the bolting point in front of the existing openings 52 in the articulated arm 7. This obviates the need to modify the structure of the articulated arm 7. Advantageously, the fastening support 28 of the locking module 18 comprises two locking pins 53 and the fastening module 23 comprises two locking sleeves 54. Each of the two locking pins 53 is intended to be inserted into a locking sleeve 54. Each of the two locking pins 53 has a quarter-turn fastening stud 55, enabling quarter-turn fastening in cooperation with a locking ramp 49 included in each of the two locking sleeves 54 (FIG. 18). For example, the locking ramp 49 is a first end 49a of a cylinder 49c coaxial with the locking sleeves 45. The second end 49b of the cylinder 49c is fastened to the mouth of the locking sleeves 45. Each of the two locking pins 53 also includes a handle 56 enabling a user to rotate the quarter-turn fastening stud 55 of each of the two locking pins 53 to removably fasten the locking module 18 to the fastening module 23 or detach the locking module 18 from the fastening module 23. Preferably, one of the two locking sleeves 54 has a different shape to the other sleeve. For example, one locking sleeve is a cylinder with a circular section and the other locking sleeve is a cylinder with an oblong section. Each of the two locking pins 53 is shaped to fit the locking sleeve 54 in which the locking pin is intended to be inserted. This ensures that a user cannot incorrectly position the locking module 18 relative to the fastening module 23 when fastening the module to the fastening module 23. The locking sleeves 54 are, for example, made of stainless steel to prevent corrosion.

Figure 19:
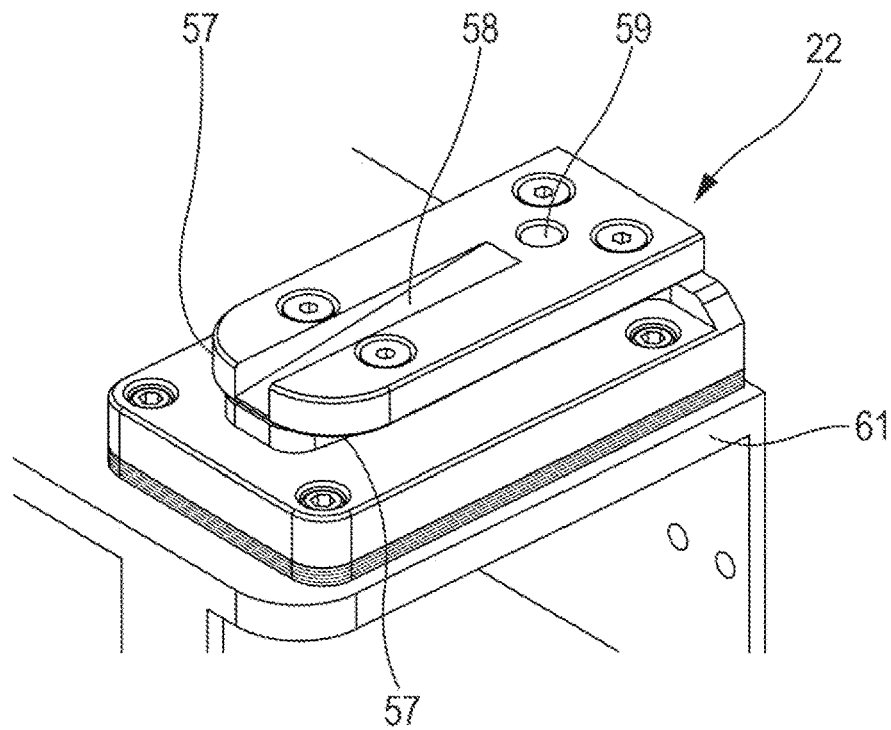
FIG. 19 is a perspective view of the second fastening module mounted on a structure rigidly connected to the frame.
Figure 20:
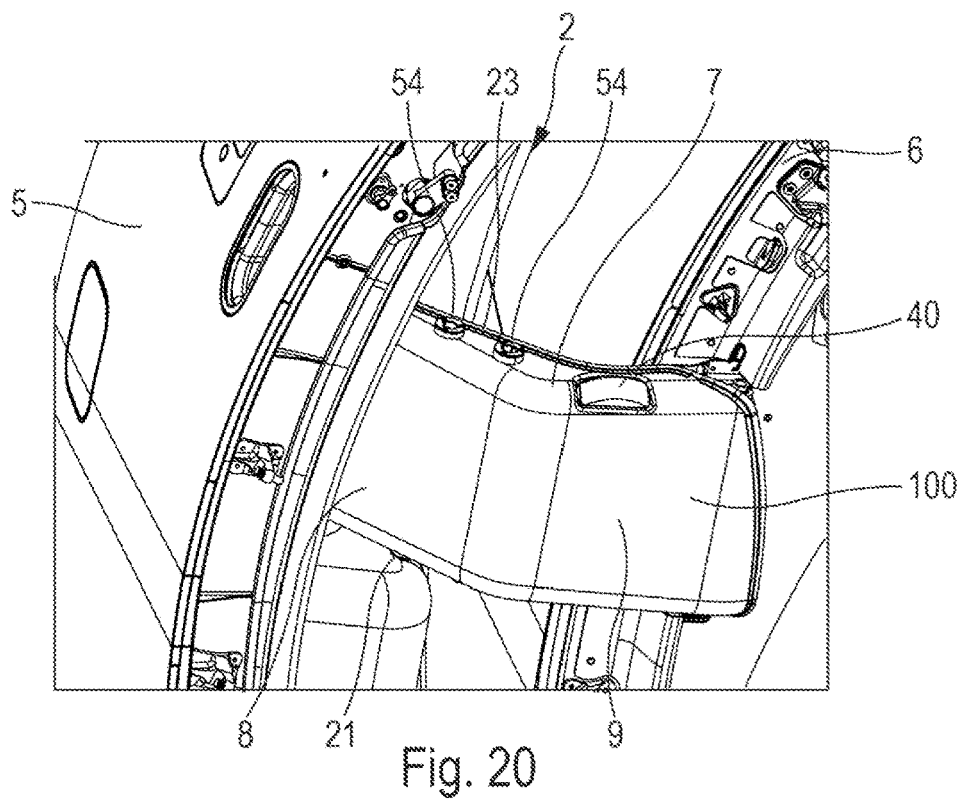
FIG. 20 is a perspective view of the articulated arm to which the first and third fastening modules and the protective cover have been fastened.
Figure 21:
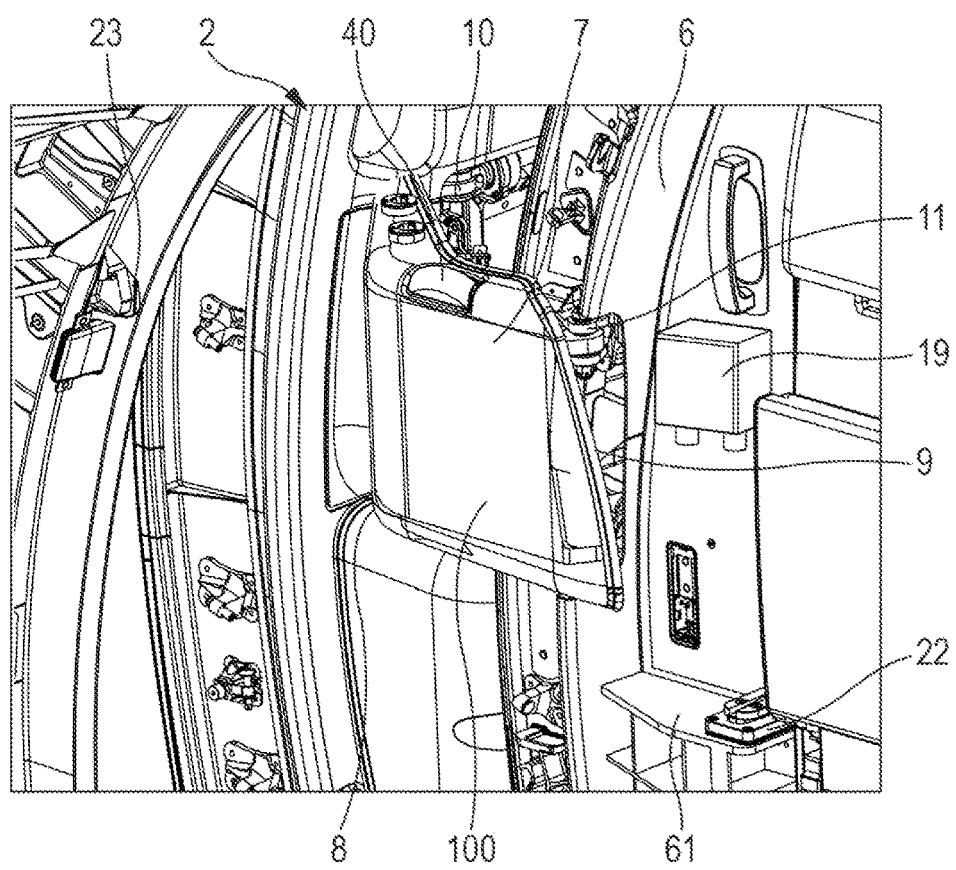
FIG. 21 is a perspective view of the articulated arm to which the first and third fastening modules, the control device and the second fastening module have been fastened.

Furthermore, the fastening device 20 comprises a fastening module 22 designed to be rigidly connected to the structure 61 rigidly connected to the frame 6 (FIG. 19, FIG. 22). The closing module 17 is intended to be removably fastened to the fastening module 22. The fastening module 22 is designed to be bolted to the structure 61 rigidly connected to the frame 6. Advantageously, the fastening support 28 of the closing module 17 comprises two opposing rails (not shown) and the fastening module 22 comprises two slides 57. Each of the two rails is designed to slide in each of the slides 57. Furthermore, the fastening support 28 can include a spring-mounted stop pin (not shown) projecting between the two rails. The fastening module 22 may comprise a ramp 58 and a stop opening 59 (FIG. 19). The stop pin is designed to slide on the ramp as the two rails slide in the slides 57 as far as the stop opening 59. During such sliding, the stop pin decreases in height by compressing the spring. When the stop pin reaches the stop opening 59, the stop pin extends under the force of the spring into the stop opening 59 to block the closing module 17 in relation to the fastening module 22. A user can disengage the stop pin in the stop opening 59 if the user wishes to detach the closing module 17 from the fastening module 22.

The system 1 can be installed as follows.

The fastening module 21 is rigidly connected to the first end 8 of the articulated arm 7. The fastening module 22 is rigidly connected to the structure 61 rigidly connected to the frame 6. Finally, the fastening module 23 is rigidly connected to the articulated arm 7.

The fastening support 24 of the closing module 16 is removably fastened to the fastening module 21. The guide screw 30 of the closing module 17 is inserted into the guide ring 26 of the link coupling 25 of the closing module 16. The fastening support 28 of the closing module 17 is then removably fastened to the fastening module 22. Finally, the fastening support 37 of the locking device is removably fastened to the fastening module 23.

If the articulated arm includes a protective cover 100 (usually made of plastic) (FIG. 20, FIG. 21), the protective cover can be removed to rigidly connect the fastening modules 21, 22, 23 to the articulated arm 7. The protective cover 100 can then be reassembled on the articulated arm 7 after holes have been drilled to make the locking sleeves 45 accessible to the locking pins 53.

Figure 23:
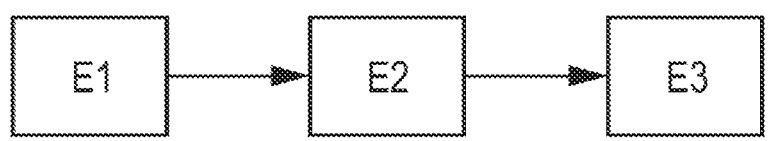
FIG. 23 is a schematic view of the remote closing method for the door leaf.

The invention also relates to a method for remotely closing the door leaf 5 using the system 1 (FIG. 23).

The closing method can be implemented when a user sends a command to close the door leaf 5 to the control device 19 via the human-machine interface 191.

The method comprises at least a closing step E2 and a locking step E3.

The closing step E2 is implemented by the closing device 15 in response to a closing command received from the control device 19 following receipt by the control device 19 of commands transmitted remotely by the user. This involves the closing module 17 pulling the closing module 16 towards itself so as to bring the door leaf 5 into the closed position.

The closing step E2 may comprise:
transmission of a command O1 from the control device 19 to the actuator M1 representing an angle of rotation of the guide screw 30 required to bring the door leaf 5 into the closed position,
activation of the actuator M1 according to the command O1,
rotation of the guide screw 30 driven by the actuator M1 through the angle of rotation required to bring the door leaf 5 into the closed position,
translational movement of the lug coupling 31 along the guide screw 30 driven by the rotation of the guide screw 30,
translational movement of the link coupling 25 along the guide screw 30 driven by the translational movement of the lug coupling 31,
traction of the first end 8 of the articulated arm 7 driven by the translational movement of the lug coupling 31 of the closing module 16 until the door leaf 5 is in the closed position.

If the door 2 includes a blocking element 40 for the door leaf 5, the closing step E2 can also include the transmission of a command O5 from the control device 19 to the actuator M5 representing a translational distance of the release pin 39. In this case, the command O5 is transmitted before the command O1.

In this closing step E2, the control device can receive the electrical signal S1 from the position sensor C1 when the lug coupling 31 is in the closed position along the guide screw. When the control device 19 receives this electrical signal S1, the control device 19 commands the actuator M1 to stop the rotation of the guide screw 30. If the door 2 includes a blocking element 40, the control device 19 can await receipt of the electrical signal S14 confirming that the blocking element 40 is no longer blocking the door leaf 5 in the open position, in order to transmit the command O1.

In the locking step E3, the locking device 18 moves the locking lever 13 into the locking position to lock the door leaf 5 in response to receipt of a locking command from the control device 19.

The locking step E3 may include:
transmission of a command O3 from the control device 19 to the actuator M3 representing an angle of rotation for positioning the two guide pins 38 about the rotation axis A4 of the locking lever 13 when the door leaf 5 is in the closed position. The positioning angle of rotation is defined to move the two guide pins 38 in front of the locking lever 13,
activation of the actuator M3 as a function of the command O3 representing the angle of rotation for positioning the two guide pins 38,
rotation of the two guide pins 38 through the positioning angle of rotation of the two guide pins 38,
transmission of a command O4 from the control device 19 to the actuator M4 representing an angle of rotation for clamping the two guide pins 38 about a rotation axis A5 perpendicular to the rotation axis A4 of the locking lever 13 when the door leaf 5 is in the closed position. The clamping angle of rotation is defined to cause the two guide pins 38 to clamp the locking lever 13,
activation of the actuator M4 as a function of the command O4 representing the angle of rotation for clamping the two guide pins 38,
rotation of the two guide pins 38 through the clamping angle of rotation of the two guide pins 38,
transmission of a command O6 from the control device 19 to the actuator M3 representing an angle of rotation for locking the two guide pins 38 about the rotation axis A4 of the locking lever 13 when the door leaf 5 is in the closed position. The locking angle of rotation is defined to cause the two guide pins 38 to rotate the locking lever 13 into the locking position,
activation of the actuator M3 as a function of the command O6 representing the locking angle of rotation,
rotation of the two guide pins 38 through the locking angle of rotation of the two guide pins 38.

In this step E3, the control device can receive the electrical signal S7 from the position sensor C7 when the two guide pins 38 are clamping the locking lever 13. When the control device 19 receives this electrical signal S7, the control device 19 can start transmitting the command O6. The control device can then receive the electrical signal S9 from the position sensor C9 when both guide pins 38 are in the locking position. When the control device 19 receives this electrical signal S9, the control device 19 can confirm to the user that the door leaf 5 is closed and locked. The confirmation can be transmitted from the control device 19 to the human-machine interface 191 in the form of an electrical closing (and locking) confirmation signal. When the door leaf 5 is in the closed position, the control device 19 can command the actuators M1 and M2 to move the lug coupling 31 to the default position. The control device 19 can also command the actuators M3 and M4 to move the guide pins 38 to the default position thereof.

The method can also include a step E1 for positioning the lug coupling 31. The positioning step E1 involves engaging the lug coupling 31 in the link coupling 25. This step may precede steps E2 and E3.

The step E1 for positioning the lug coupling 31 may comprise:
transmission of a command O2 from the control device 19 to the actuator M2 representing an angle of rotation of the assembly 36 about the longitudinal rotation axis A3 of the guide screw 30. The angle of rotation of the assembly 36 is defined to bring the lug or lugs 32 of the lug coupling 31 in front of the notch or notches 35 of the link coupling 25,
activation of the actuator M2 as a function of the command O2 representing the angle of rotation of the assembly 36,
rotation of the assembly 36 through the angle of rotation of the assembly 36,
transmission of a command O7 from the control device 19 to the actuator M1 representing an angle of rotation of the guide screw 30 about the longitudinal rotation axis A3 of the guide screw 30. The angle of rotation of the guide screw 30 is defined to move the lug coupling 31 in translation so that the lug or lugs are in the inner circular groove 27 after passing through the notch or notches 35 of the link coupling 25, activation of the actuator M1 as a function of the command O7 representing the angle of rotation of the assembly 36, rotation of the guide screw 30 through the angle of rotation defined in the command O7, transmission of a command O8 from the control device 19 to the actuator M2 representing an angle of rotation of the assembly 36 about the longitudinal rotation axis A3 of the guide screw 30. The angle of rotation of the assembly 36 is defined to move the lug or lugs 32 of the lug coupling 31 angularly away from the notch or notches 35 of the link coupling 25, activation of the actuator M2 as a function of the command O8 representing the angle of rotation of the assembly 36, rotation of the assembly 36 through the angle of rotation of the assembly 36.

In this step E1, the control device can receive the electrical signal S5 from the position sensor C5 when the lug or lugs are in front of the notch or notches 35. When the control device 19 receives this electrical signal S5, the control device 19 commands the actuator M2 to stop the rotation of the assembly 36. The control device 19 can then transmit the command O7 to the actuator M1. When the control device 19 then receives the electrical signal S4 from the position sensor C4, the control device 19 commands the actuator M1 to stop the rotation of the guide screw 30. The control device 19 can then transmit the command O8 to the actuator M2. When the control device 19 receives the electrical signal S6 from the position sensor C6, the control device 19 commands the actuator M2 to stop rotation of the assembly 36. When the control device 19 receives this electrical signal S6, the control device 19 can implement the closing step E2.

Figure 24:
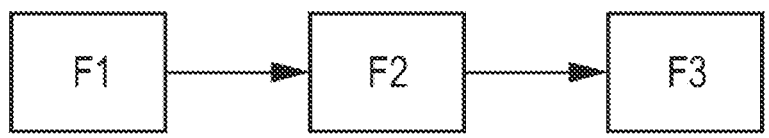
FIG. 24 is a schematic view of a remote closing method for the door leaf.

The invention also relates to a method for remotely opening the door leaf 5 using the system 1 (FIG. 24).

The opening method can be implemented when a user sends a command to open the door leaf 5 to the control device 19 via the human-machine interface 191.

The method comprises at least one unlocking step F2 in response to receipt of an unlocking command from the control device 19 following receipt by the control device 19 of commands transmitted remotely by the user, and an opening step F3 in response to receipt of an opening command from the control device 19.

The unlocking step F2 may comprise:
transmission of a command P1 from the control device 19 to the actuator M3 representing an angle of rotation for positioning the two guide pins 38 about the rotation axis A4 of the locking lever 13 when the door leaf 5 is in the closed position. The positioning angle of rotation is defined so that the two guide pins 38 are in front of the locking lever 13, which is in the locking position, activation of the actuator M3 as a function of the command P1 representing the angle of rotation for positioning the two guide pins 38, rotation of the two guide pins 38 through the positioning angle of rotation of the two guide pins 38, transmission of a command P2 from the control device 19 to the actuator M4 representing an angle of rotation for clamping the two guide pins 38 about a rotation axis A5 perpendicular to the rotation axis A4 of the locking lever 13 when the door leaf 5 is in the closed position. The clamping angle of rotation is defined to cause the two guide pins 38 to clamp the locking lever 13, activation of the actuator M4 as a function of the command P2 representing the angle of rotation for clamping the two guide pins 38, rotation of the two guide pins 38 through the clamping angle of rotation of the two guide pins 38, transmission of a command P3 from the control device 19 to the actuator M3 representing an angle of rotation for unlocking the two guide pins 38 about the rotation axis A4 of the locking lever 13 when the door leaf 5 is in the closed position. The unlocking angle of rotation is defined to cause the two guide pins 38 to rotate the locking lever 13 into the unlocked position, activation of the actuator M3 as a function of the command P3 representing the unlocking angle of rotation, rotation of the two guide pins 38 through the unlocking angle of rotation of the two guide pins 38.

In this step F2, the control device can receive the electrical signal S7 from the position sensor C7 when the two guide pins 38 are clamping the locking lever 13. When the control device 19 receives this electrical signal S7, the control device 19 can start transmitting the command P3. The control device can then receive the electrical signal S9 from the position sensor C10 when both guide pins 38 are in the unlocked position. When the control device 19 receives this electrical signal S10, the control device 19 can implement the opening step F3.

The opening step F3 is implemented by the closing device 15. This involves the closing module 17 moving the closing module 16 away from itself so as to bring the door leaf 5 into the open position.

The opening step F3 may comprise:
transmission of a command P4 from the control device 19 to the actuator M1 representing an angle of rotation of the guide screw 30 required to bring the door leaf 5 into the open position, activation of the actuator M1 as a function of the command P4, rotation of the guide screw 30 driven by the actuator M1 through the angle of rotation required to bring the door leaf 5 into the open position, translational movement of the lug coupling 31 along the guide screw 30 driven by the rotation of the guide screw 30, translational movement of the link coupling 25 along the guide screw 30 driven by the translational movement of the lug coupling 31, pushing of the first end 8 of the articulated arm 7 driven by the translational movement of the lug coupling 31 of the closing module 16 until the door leaf 5 is in the open position.

In this opening step F3, the control device 19 can receive the electrical signal S2 from the position sensor C2 when the lug coupling 31 is in the open position along the guide screw. When the control device 19 receives this electrical signal S2, the control device 19 commands the actuator M1 to stop the rotation of the guide screw 30.

The control device 19 can also command the actuator M1 to stop the rotation of the guide screw 30 when the control device 19 receives the electrical signal S13 indicating that the door leaf 5 is blocked by the blocking element 40. When the control device 19 receives the electrical signal S13 (or the electrical signal S2 in another embodiment), the control device 19 can confirm to the user that the door leaf 5 is unlocked and open. The confirmation can be transmitted from the control device 19 to the human-machine interface 191 in the form of an electrical opening confirmation signal.

The method can also include a step F1 for positioning the lug coupling 31. The positioning step F1 involves engaging the lug coupling 31 in the link coupling 25. This step may precede the steps F2 and F4. This step F1 is identical to the step E1. When the control device 19 receives this electrical signal S6, the control device 19 can implement the unlocking step F2.

The actuators M1, M2, M3, M4 and M5 can be electric actuators, pneumatic actuators or hydraulic actuators without moving outside the scope of the invention.

To reduce the number of position sensors, the position sensors C1 to C14 can be replaced, if required, by encoding systems (encoder, analogue sensor with a ramp, etc.).

The system 1 has several advantages in addition to those described above in the description:
- the system 1 can be handled by a single person, as the mass of the different components is low,
- the positioning of this system 1 does not require any modification to the structure and therefore has no impact on the certification of the aircraft AC,
- if necessary, the system 1 can be operated manually, for example during maintenance operations,
- no special tools are required to assemble and disassemble the system 1 according to the invention, as disassembly can be carried out with the door 2 in any position,
- the positioning of the system 1 can be automated.

The systems and devices described herein may include a controller, control unit, control device, such as the control device 19, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for remotely closing and opening a door provided for an access opening in a fuselage of an aircraft, the door comprising:
   a door leaf,
   a frame delimiting the access opening and an articulated arm, the frame being rigidly connected to the fuselage,
      the door leaf being configured to be alternately in a closed position when the door leaf is closing the access opening and an open position when the door leaf leaves the access opening open,
      the articulated arm comprising a first end articulated with the door leaf and a second end articulated with the frame so that the door leaf remains parallel with itself when moving from the open position to the closed position and vice versa,
   a locking mechanism configured to alternately lock and unlock the door leaf when the door leaf is in the closed position,
      the locking mechanism comprising a locking lever having one end that is rotatably mounted on the door leaf about a rotation axis perpendicular to the door leaf, the locking lever being configured to be alternately in a locking position in which the locking mechanism locks the door leaf and an unlocked position in which the locking mechanism is not locking the door leaf, wherein the system comprises:
   a closing and opening device comprising a first closing and opening module configured to be removably fastened to the first end of the articulated arm and a second closing and opening module intended to be removably fastened to a structure rigidly connected to the frame, the second closing and opening module being configured to alternately pull the first closing and opening module towards itself so as to bring the door leaf into the closed position and to move the first closing and opening module away from itself so as to bring the door leaf into the open position, a locking and unlocking device configured to be removably fastened to the articulated arm, the locking and unlocking device being configured to move the locking lever alternately into the unlocked position to unlock the door leaf and into the locked position to lock the door leaf, a control device configured to transmit commands for closing or opening the door leaf to the closing and opening device and commands for locking or unlocking the door leaf to the locking and unlocking device, as a function of commands transmitted remotely to the control device by a user.

2. The system according to claim 1, wherein the second closing and opening module comprises a screw-coupling system including:

a guide screw having a longitudinal rotation axis, the guide screw being configured to rotate about the longitudinal rotation axis thereof, and a lug coupling screwed to the guide screw, the lug coupling being configured to move in translation along the guide screw when the guide screw rotates, the lug coupling being removably connected to the first closing and opening module, the translational movement of the lug coupling alternately causing:

the first closing and opening module to move towards the second closing and opening module so as to bring the door leaf into the closed position, and the first closing and opening module to move away from the second closing and opening module so as to bring the door leaf into the open position.

3. The system according to claim 2, wherein the first closing and opening module comprises:
 a fastening support configured to be removably fastened to the first end of the articulated arm,
 a link coupling rotatably mounted on the fastening support about a rotation axis, the link coupling having a guide ring with a diameter coinciding with the rotation axis of the link coupling, the guide ring having an inner circular groove, the lug coupling having at least one lug configured to be at least partially removably engaged in the inner circular groove of the guide ring, the rotation axis of the link coupling being configured to be perpendicular to the longitudinal rotation axis of the guide screw when the lug coupling is engaged in the inner circular groove of the guide ring, wherein the second closing and opening module further comprises:
 a fastening support configured to be removably fastened to the structure rigidly connected to the frame,
 an auxiliary support rotatably mounted on the fastening support about a vertical rotation axis, the guide screw being rotatably mounted on the auxiliary support about the longitudinal rotation axis thereof,
 a guide tube concentrically surrounding the guide screw, the guide tube comprising at least one longitudinal slot, the lug or lugs of the lug coupling projecting from the guide tube through the longitudinal slot or slots, the guide tube being configured to engage in the guide ring of the link coupling,
 a first actuator configured to rotate the guide screw about the longitudinal rotation axis thereof, the control device being configured to send a command to the first actuator representing an angle of rotation of the guide screw to be applied by the first actuator, the commands for closing or opening the door leaf comprising the command representing the angle of rotation of the guide screw, the rotation of the guide screw causing a translational movement of the lug coupling that is prevented from rotating by the lug or lugs projecting from the guide tube through the longitudinal slot or slots, the translational movement being parallel to the longitudinal rotation axis of the guide screw, the translational movement of the lug coupling engaged in the inner circular groove of the guide ring causing alternately:
 the first closing and opening module to move away from the second closing and opening module, and
 the first closing and opening module to move towards the second closing and opening module.

4. The system according to claim 3, wherein the link coupling comprises at least one notch configured to allow the passage of the lug or lugs of the lug coupling when the lug or lugs moving in translation parallel to the longitudinal rotation axis of the guide screw are in front of the notch or notches, the second closing and opening module further comprising a second actuator configured to rotate an assembly comprising the guide screw as well as the first actuator and the guide tube about the longitudinal rotation axis of the guide screw, the control device being configured to send a command to the second actuator representing an angle of rotation of said assembly to be applied by the second actuator, the commands for closing or opening the door leaf comprising the command representing the angle of rotation of the assembly, the rotation of the assembly alternately enabling:
 the lug or lugs to be brought in front of the notch or notches to enable the lug or lugs to pass through the notch or notches to engage the lug or lugs in the inner circular groove of the guide ring or to separate the lug or lugs from the inner circular groove of the guide ring, or
 the lug or lugs to be moved angularly away from the notch or notches to engage the lug or lugs in the inner circular groove of the guide ring or to disengage the lug or lugs from the inner circular groove of the guide ring following separation of the lug or lugs from the inner circular groove of the guide ring.

5. A system according to claim 3, wherein the closing and opening device further comprises:
 a first position sensor configured to transmit an electrical signal to the control device when the lug coupling is in a closed position along the guide screw, the electrical signal transmitted by the first position sensor representing a position of the lug coupling when the lug coupling is in the closed position along the guide screw, the closed position along the guide screw being a position of the lug coupling required for the door leaf to be in the closed position,
 a second position sensor configured to transmit an electrical signal to the control device when the lug coupling is in an open position along the guide screw, the electrical signal transmitted by the second position sensor representing a position of the lug coupling when the lug coupling is in the open position along the guide screw, the open position along the guide screw being a position of the lug coupling required for the door leaf to be in the open position,
a third position sensor configured to transmit an electrical signal to the control device when the lug coupling is in a default position along the guide screw, the electrical signal transmitted by the third position sensor representing a position of the lug coupling when the lug coupling is in the default position along the guide screw,
a fourth position sensor configured to transmit an electrical signal to the control device when the lug coupling is in an engaged position, the electrical signal transmitted by the fourth position sensor representing a position of the lug coupling when the lug coupling is in the engaged position, the engaged position being a position in which the lug or lugs of the lug coupling are located in the inner circular groove of the guide ring.

6. The system according to claim 5,
wherein the closing and opening device further comprises:
a fifth position sensor designed to transmit an electrical signal to the control device when the lug or lugs of the lug coupling are in front of the notch or notches, the electrical signal transmitted by the fifth position sensor representing an angular position of the second actuator when the lug or lugs of the lug coupling are in front of the notch or notches,
a sixth position sensor designed to transmit an electrical signal to the control device when the lug or lugs of the lug coupling are not in front of the notch or notches, the electrical signal transmitted by the sixth position sensor representing an angular position of the second actuator when the lug or lugs of the lug coupling are not in front of the notch or notches.

7. The system according to claim 1, further comprising a fastening device comprising:
a first fastening module configured to be rigidly connected to the first end of the articulated arm, the first closing and opening module being configured to be removably fastened to the first fastening module,
a second fastening module configured to be rigidly connected to the structure rigidly connected to the frame, the second closing and opening module being configured to be removably fastened to the second fastening module,
a third fastening module configured to be rigidly connected to the articulated arm, the locking and unlocking device being configured to be removably fastened to the third fastening module.

8. The system according to claim 1, wherein the locking and unlocking device comprises:
a fastening support configured to be removably fastened to the articulated arm,
two guide pins between which the locking lever is configured to be clamped, the two guide pins being rotatably mounted on the fastening support,
a third actuator configured to rotate the two guide pins through a first angle of rotation about the rotation axis of the locking lever when the door leaf is in the closed position, the control device being configured to send a command to the third actuator representing the first angle of rotation of the two guide pins to be applied by the third actuator, the commands for locking or unlocking the door leaf comprising the command representing the first angle of rotation of the two guide pins,
a fourth actuator configured to rotate the two guide pins through a second angle of rotation about a rotation axis perpendicular to the rotation axis of the locking lever when the door leaf is in the closed position, the control device being configured to send a command to the fourth actuator representing the second angle of rotation of the two guide pins to be applied by the fourth actuator, the commands for locking or unlocking the door leaf comprising the command representing the second angle of rotation of the two guide pins.

9. The system according to claim 8, wherein the locking and unlocking device further comprises:
a seventh position sensor configured to transmit an electrical signal to the control device when the two guide pins are clamping the locking lever, the electrical signal transmitted by the seventh position sensor representing a position of the two guide pins when said pins are clamping the locking lever,
an eighth position sensor configured to transmit an electrical signal to the control device when the two guide pins are not clamping the locking lever, the electrical signal transmitted by the eighth position sensor representing a position of the two guide pins when said pins are not clamping the locking lever,
a ninth position sensor configured to transmit an electrical signal to the control device when the two guide pins are in a locking position about the rotation axis of the locking lever, the electrical signal transmitted by the ninth position sensor representing a position of the two guide pins when the two guide pins are in the locking position about the rotation axis of the locking lever, the locking position being a position of the two guide pins required for the locking lever to be in the locked position,
a tenth position sensor configured to transmit an electrical signal to the control device when the two guide pins are in an unlocked position about the rotation axis of the locking lever, the electrical signal transmitted by the tenth position sensor representing a position of the two guide pins when the two guide pins are in the unlocked position about the rotation axis of the locking lever, the unlocked position being a position of the two guide pins required for the locking lever to be in the unlocked position,
an eleventh position sensor configured to transmit an electrical signal to the control device when the two guide pins are in a default position, the electrical signal transmitted by the eleventh position sensor representing a position of the two guide pins when the two guide pins are in the default position,
a twelfth position sensor configured to transmit an electrical signal to the control device when an airstair at the access opening is deployed.

10. The system according to claim 1, wherein the locking and unlocking device further comprises:
a release pin configured to disengage a blocking element intended to block the door leaf in the open position once the door leaf has been opened,
a fifth actuator configured to move the release pin in translation to disengage the blocking element by bringing the release pin into a released position, the control device being configured to send a command to the fifth actuator representing a translational distance of the release pin to be applied by the fifth actuator, the commands for unlocking the door leaf comprising the command representing the translational distance of the release pin.

11. The system according to claim 10, wherein the locking and unlocking device further comprises:
- a thirteenth position sensor configured to transmit an electrical signal to the control device when the release pin is not in the released position, the electrical signal transmitted by the thirteenth position sensor representing the position of the release pin,
- a fourteenth position sensor configured to transmit an electrical signal to the control device when the release pin is in the released position, the electrical signal transmitted by the fourteenth position sensor representing the released position of the release pin.

12. A method for remotely closing the door leaf using the remote opening and closing system according to claim 1, comprising the following steps:
- a closing step implemented by the closing and opening device that involves the second closing and opening module pulling the first closing and opening module towards itself to bring the door leaf into the closed position in response to receipt of a closing command from the control device following receipt by the control device of commands transmitted remotely by a user,
- a locking step in which the locking and unlocking device moves the locking lever into the locking position to lock the door leaf in response to receipt of a locking command from the control device.

13. The method according to claim 12, wherein the closing step comprises:
- transmission of a command from the control device to the first actuator representing an angle of rotation of the guide screw required to bring the door leaf into the closed position,
- activation of the first actuator as a function of the command representing the angle of rotation of the guide screw,
- rotation of the guide screw driven by the first actuator through the angle of rotation required to bring the door leaf into the closed position,
- translational movement of the lug coupling driven by the rotation of the guide screw,
- translational movement of the link coupling driven by the translational movement of the lug coupling, and
- traction of the first end of the articulated arm driven by the translational movement of the lug coupling of the closing module until the door leaf is in the closed position.

14. The method according to claim 12, wherein the locking step comprises:
- transmission of a command from the control device to the third actuator representing an angle of rotation for positioning the two guide pins about the rotation axis of the locking lever when the door leaf is in the closed position, the positioning angle of rotation bringing the two guide pins in front of the locking lever,
- activation of the third actuator as a function of the command representing the angle of rotation for positioning the two guide pins,
- rotation of the two guide pins through the positioning angle of rotation of the two guide pins,
- transmission of a command from the control device to the fourth actuator representing an angle of rotation for clamping the two guide pins about a rotation axis perpendicular to the rotation axis of the locking lever when the door leaf is in the closed position, the clamping angle of rotation causing the two guide pins to clamp the locking lever,
- activation of the fourth actuator as a function of the command representing the angle of rotation for clamping the two guide pins,
- rotation of the two guide pins through the clamping angle of rotation of the two guide pins,
- transmission of a command from the control device to the third actuator representing an angle of rotation for locking the two guide pins about the rotation axis of the locking lever when the door leaf is in the closed position, the locking angle of rotation causing the two guide pins to rotate the locking lever into the locking position,
- activation of the third actuator as a function of the command representing the locking angle of rotation, and
- rotation of the two guide pins through the locking angle of rotation of the two guide pins.

15. An aircraft comprising a remote opening and closing system according to claim 1.

* * * * *